US011599645B2

(12) United States Patent
Waplington

(10) Patent No.: US 11,599,645 B2
(45) Date of Patent: Mar. 7, 2023

(54) SYSTEMS AND METHODS FOR PREDICTING CYBERSECURITY VULNERABILITIES

(71) Applicant: ServiceNow, Inc., Santa Clara, CA (US)

(72) Inventor: Brian James Waplington, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 2 days.

(21) Appl. No.: 17/143,969

(22) Filed: Jan. 7, 2021

(65) Prior Publication Data

US 2022/0215100 A1    Jul. 7, 2022

(51) Int. Cl.
*G06F 21/00* (2013.01)
*G06F 21/57* (2013.01)
*G06F 21/54* (2013.01)
*G06F 21/56* (2013.01)
*G06F 21/55* (2013.01)

(52) U.S. Cl.
CPC ............ *G06F 21/577* (2013.01); *G06F 21/54* (2013.01); *G06F 21/554* (2013.01); *G06F 21/566* (2013.01)

(58) Field of Classification Search
CPC ...... G06F 21/566; G06F 21/554; G06F 21/54; G06F 21/57; G06F 21/07
USPC .......................................................... 726/25
See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |

(Continued)

*Primary Examiner* — Josnel Jeudy
(74) *Attorney, Agent, or Firm* — Fletcher Yoder PC

(57) ABSTRACT

Systems and methods are disclosed that predict whether a configuration item of a service provider cloud infrastructure client instance has a vulnerability, prior to scanning for the client instance for the vulnerability. In particular, operating system and/or application information of the vulnerability may be compared to that of the configuration item, operating system and/or application information of past vulnerabilities may be compared to that of the vulnerability, additional vulnerabilities that are solved by solutions that remedy the vulnerability may be compared to the configuration, and/or a machine-learning model may be trained to determine how similar past vulnerabilities of the configuration item are to the vulnerability. Based on one or more of these comparisons, a predicted vulnerable item may be generated that indicates that the configuration item is subject to the vulnerability.

19 Claims, 9 Drawing Sheets

(56) References Cited

U.S. PATENT DOCUMENTS

| | | |
|---|---|---|
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,683 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2017/0230398 A1* | 8/2017 | Ahmed .................. G06N 7/005 |
| 2019/0268366 A1* | 8/2019 | Zeng .................... G06N 3/0472 |
| 2019/0342323 A1* | 11/2019 | Henderson ............ G06F 16/285 |
| 2021/0273959 A1* | 9/2021 | Salji ....................... H04L 67/141 |
| 2022/0019674 A1* | 1/2022 | Frey ....................... H04L 63/20 |
| 2022/0078203 A1* | 3/2022 | Shakarian ............. G06F 16/951 |
| 2022/0138041 A1* | 5/2022 | Degrass ................. G06F 21/57 |
| | | 714/38.1 |

\* cited by examiner

SYSTEMS AND METHODS FOR PREDICTING CYBERSECURITY VULNERABILITIES

BACKGROUND

The present disclosure relates generally to cybersecurity vulnerabilities and more particularly to predicting the existence of cybersecurity vulnerabilities prior to scanning for the cybersecurity vulnerabilities.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Various components (e.g., computers, routers, devices, pieces of software, database tables, scripts, webpages, pieces of metadata, database instances, server instances, services, and so forth) of, for example, a client network and/or client devices utilizing an IT infrastructure, such as a cloud computing infrastructure, may be targeted by malicious entities and thus be exposed to cybersecurity vulnerabilities. To address these vulnerabilities, a variety of solutions may be developed. However, there may be delays associated with receiving and scanning the components for cybersecurity vulnerabilities, thus resulting in the components being exposed to the vulnerabilities for an extended period of time, resulting in an increased likelihood of unauthorized access or damage to the client network.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Cybersecurity vulnerability response systems and methods (e.g., in the context of a cloud-based platform) are presently disclosed that enable predicting the existence of vulnerabilities to configuration items of, for example, a client network of the cloud-based platform, prior to scanning for the cybersecurity vulnerabilities. That is, there may be delays associated with receiving and scanning the components for the vulnerabilities, including delays in publishing the vulnerabilities (e.g., by third-party sources), scanner software integration, scanning schedules, solution integration, and so on. Accordingly, it may be advantageous to predict whether vulnerabilities exist prior to scanning for the vulnerabilities. If a vulnerability is predicted to exist, a predicted vulnerable item may be generated that references (e.g., is associated with) the presumably affected configuration item and the vulnerability, indicating that the affected configuration item may be subject (e.g., susceptible to) the vulnerability. In some cases, actions of the predicted vulnerable item may be limited (e.g., the predicted vulnerable item may be given a reduced level of permissions, access to or of the predicted vulnerable item may be restricted), the predicted vulnerable item may be quarantined, related vulnerable items may be reopened if previously closed (e.g., including past vulnerabilities of the configuration item), and so on. In some embodiments, an alert or message may be sent to notify a user of the predicted vulnerable item.

In particular, in a first embodiment, if a configuration item has not been scanned for a vulnerability (e.g., a scan date for the configuration item is older than a publish date for the vulnerability), then operating system and/or application information (e.g., including version information, release information, patch information) of the vulnerability may be compared to operating system and/or application information of the configuration item. If such information for the vulnerability correlates to the configuration item, then a predicted vulnerable item may be generated that references the configuration item and the vulnerability to indicate that the configuration item may be subject to the vulnerability.

In a second embodiment, if a configuration item has not been scanned for a vulnerability, then past vulnerabilities of the configuration item may be determined. Operating system and/or application information of the past vulnerabilities may be compared to operating system and/or application information of the vulnerability and, if such information for the past vulnerabilities correlates to the vulnerability, then a predicted vulnerable item may be generated that references the configuration item and the vulnerability to indicate that the configuration item may be subject to the vulnerability.

In a third embodiment, if a configuration item has not been scanned for a vulnerability, then vulnerabilities (e.g., including those for other configuration items) related to the vulnerability may be determined. Solutions that solve the related vulnerabilities may further be determined, and additional vulnerabilities that are solved by the solutions may be determined. If these additional vulnerabilities are associated with the configuration item (e.g., the configuration item was susceptible to any of these additional vulnerabilities in the past), then a predicted vulnerable item may be generated that references the configuration item and the vulnerability to indicate that the configuration item may be subject to the vulnerability.

In a fourth embodiment, a machine-learning model may be trained to determine how similar past vulnerabilities of a configuration item are to an input vulnerability. If a vulnerability is received, and the configuration item has not been scanned for the vulnerability, then the vulnerability may be input to the machine-learning model, which may determine a similarity between the vulnerability and the past vulnerabilities of the configuration item. If the similarity is sufficiently high (e.g., greater than a threshold value), then a predicted vulnerable item may be generated that references the configuration item and the vulnerability to indicate that the configuration item may be subject to the vulnerability.

It should be understood that any or all of these embodiments may be combined to determine whether a predicted vulnerable item should be generated that indicates that a configuration item may be subject to a vulnerability. Moreover, various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
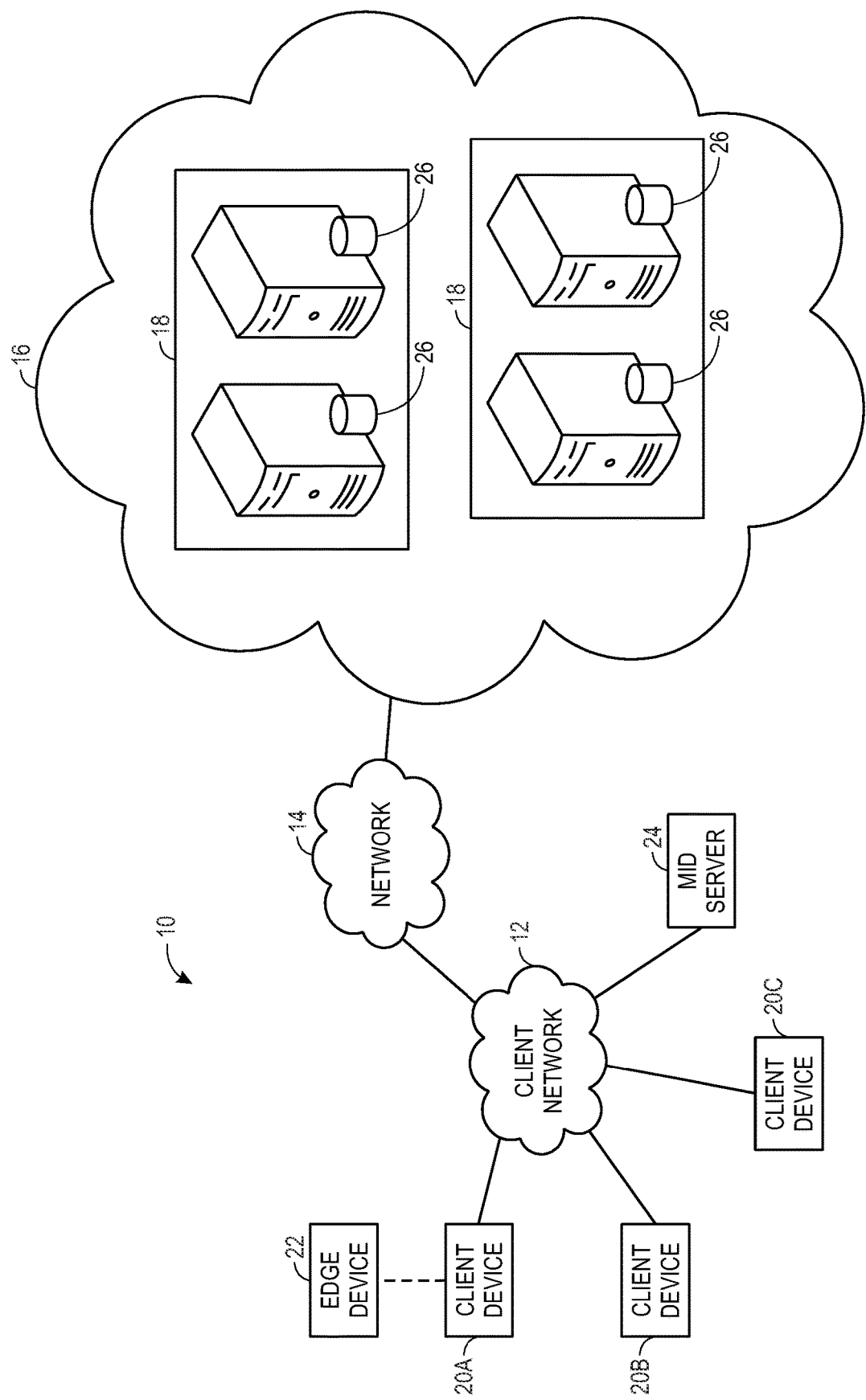
FIG. 1 is a block diagram of an embodiment of a cloud architecture including a client network and client devices in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, router, device, piece of software, database table, script, webpage, piece of metadata, database instance, server instance, service, and so forth) in an enterprise network, for which relevant data, such as manufacturer, vendor, location, or similar data, is stored in a database (e.g., a "configuration management database" or CMDB).

Various configuration items of, for example, a client network and/or client devices may be targeted by malicious entities and develop cybersecurity vulnerabilities. Such vulnerabilities may be addressed or solved using solutions, often provided by third-party sources. However, there may be delays associated with receiving and scanning the configuration items for the vulnerabilities, including delays in publishing the vulnerabilities (e.g., by third-party sources), scanner software integration, scanning schedules, solution integration, and so on. Accordingly, it may be advantageous to predict whether vulnerabilities exist prior to scanning for the vulnerabilities. If a vulnerability is predicted to exist, a predicted vulnerable item may be generated that references (e.g., is associated with) the affected configuration item and the vulnerability, indicating that the affected configuration item may be subject (e.g., susceptible to) the vulnerability. In some cases, actions of the predicted vulnerable item may be limited, the predicted vulnerable item may be quarantined, related vulnerable items may be reopened if previously closed (as the related vulnerable items may also be susceptible to the same vulnerability), and so on. In some embodiments, an alert or message may be sent to notify a user of the predicted vulnerable item.

The presently disclosed systems and methods include, comparing operating system and/or application information (e.g., including version information, release information, patch information) associated with a vulnerability to operating system and/or application information of a configuration item if the configuration item has not been scanned for the vulnerability (e.g., a scan date for the configuration item is older than a publish date for the vulnerability). If such information for the vulnerability correlates to the configuration item, then a predicted vulnerable item may be generated that references the configuration item and the vulnerability to indicate that the configuration item may be subject to the vulnerability.

The presently disclosed systems and methods also include determining past vulnerabilities of the configuration item if the configuration item has not been scanned for the vulnerability. Operating system and/or application information of the past vulnerabilities may be compared to operating system and/or application information of the vulnerability and, if such information for the past vulnerabilities correlates to the vulnerability, then a predicted vulnerable item may be generated that references the configuration item and the vulnerability to indicate that the configuration item may be subject to the vulnerability.

The presently disclosed systems and methods further include determining vulnerabilities (e.g., including those for other configuration items) related to the vulnerability if the configuration item has not been scanned for the vulnerability. Solutions that solve the related vulnerabilities may further be determined, and additional vulnerabilities that are solved by the solutions may be determined. If these additional vulnerabilities are associated with the configuration item (e.g., the configuration item was susceptible to any of these additional vulnerabilities in the past), then a predicted vulnerable item may be generated that references the configuration item and the vulnerability to indicate that the configuration item may be subject to the vulnerability.

The presently disclosed systems and methods also include training a machine-learning model to determine how similar past vulnerabilities of a configuration item are to an input vulnerability. If a vulnerability is received, and the configuration item has not been scanned for the vulnerability, then the vulnerability may be input to the machine-learning model, which may determine a similarity between the vulnerability and the past vulnerabilities of the configuration item. If the similarity is sufficiently high (e.g., greater than a threshold value), then a predicted vulnerable item may be generated that references the configuration item and the vulnerability to indicate that the configuration item may be subject to the vulnerability.

It should be understood that any or all of these embodiments may be combined to determine whether a predicted vulnerable item should be generated that indicates that the configuration item may be subject to the vulnerability. With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The networks 12, 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
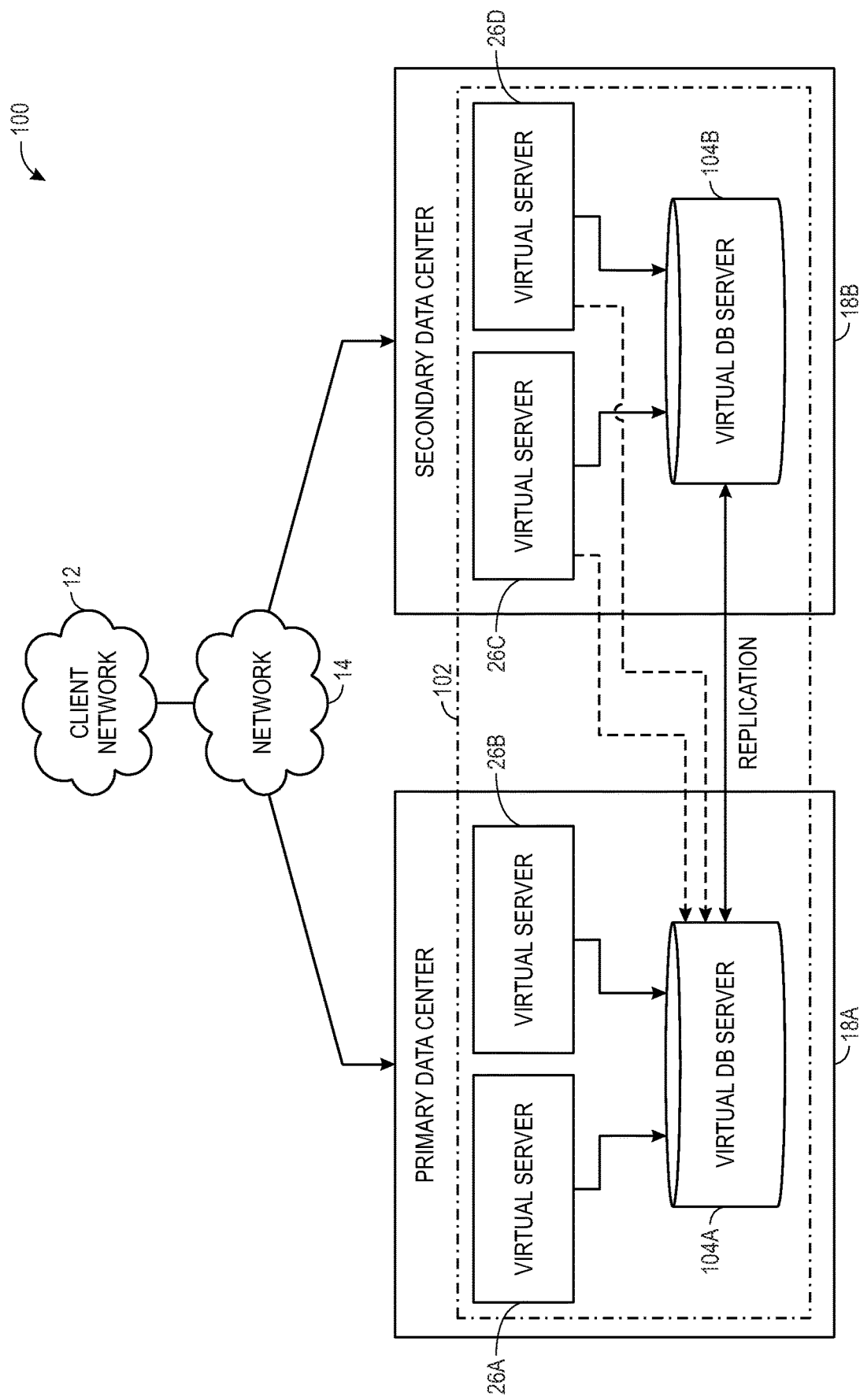
FIG. 2 is a schematic diagram of an embodiment of a multi-instance cloud architecture including a client instance in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
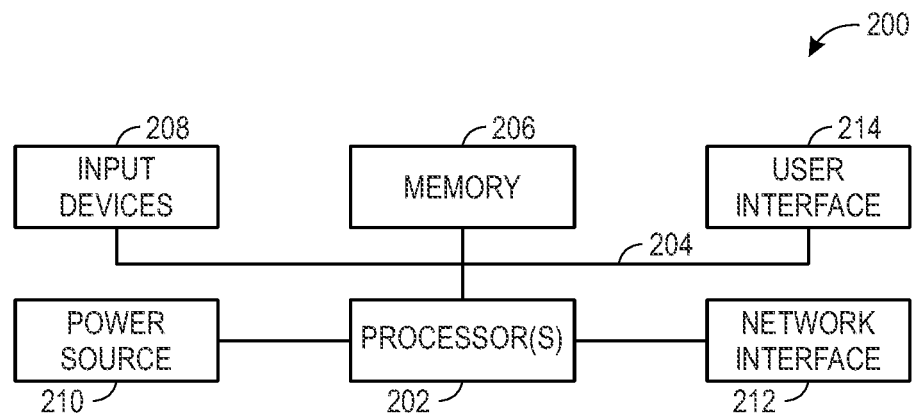
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 3, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface, a wireless network interface, an optical interface, a quantum network interface, and so on. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
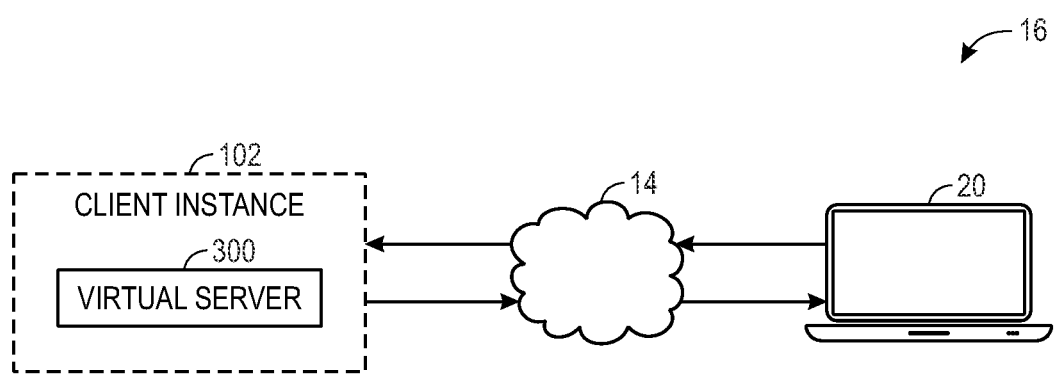
FIG. 4 is a block diagram illustrating an embodiment in which a virtual server supports and enables the client instance of FIG. 2, according to one or more disclosed embodiments.

FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
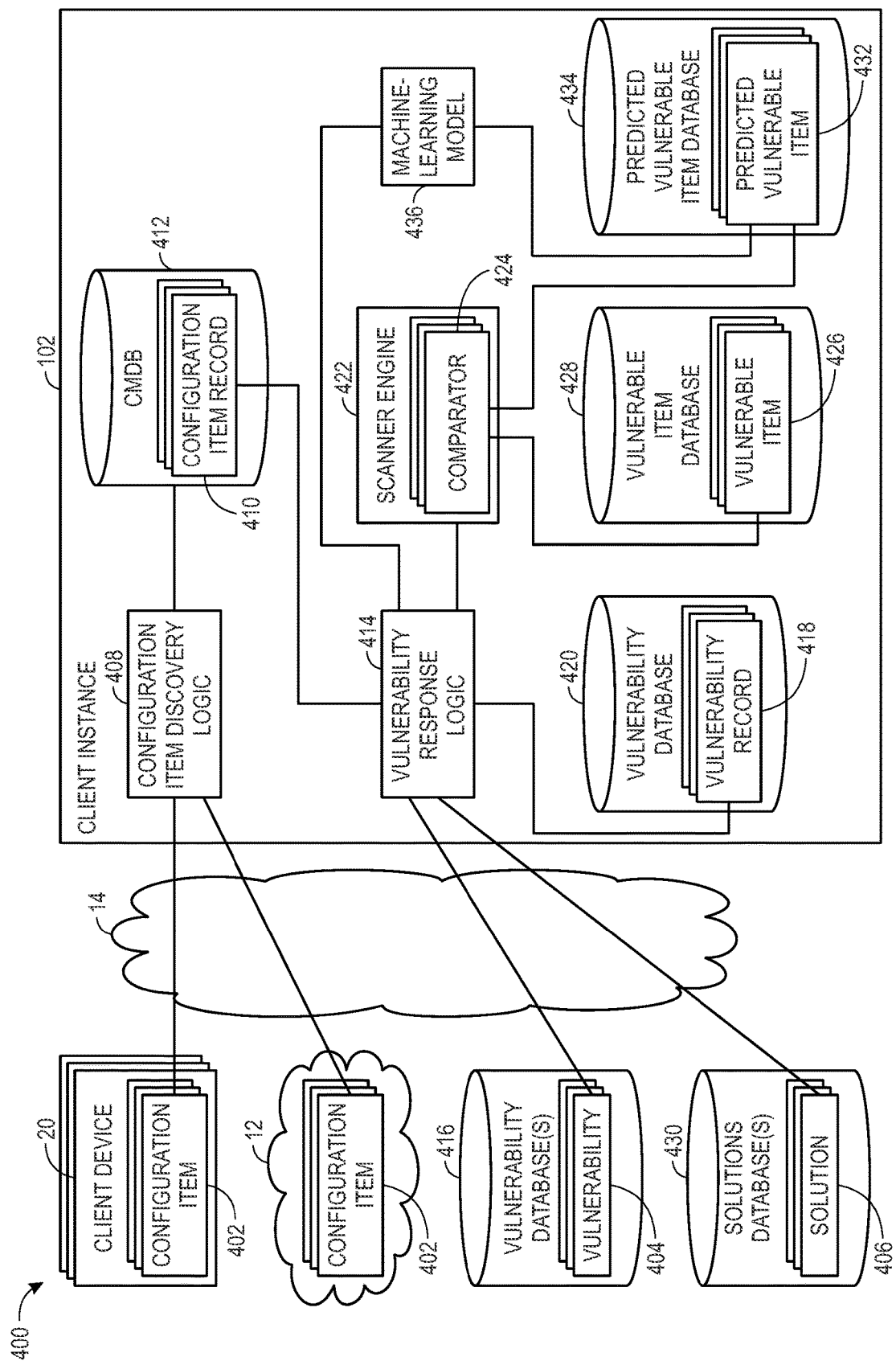
FIG. 5 is a block diagram of a system that manages configuration items of client networks and/or client devices, vulnerabilities of the configuration items, and solutions to the vulnerabilities, according to embodiments of the present disclosure.

With the preceding in mind, FIG. 5 is a block diagram of a system 400 that manages configuration items 402 of the client network 12 and/or client devices 20, vulnerabilities 404 of the configuration items 402, and solutions 406 to the vulnerabilities 404, according to embodiments of the present disclosure. The system 400 may include or operate across the client instance 102, over which configuration item discovery logic 408 may be implemented that iterates through the client devices 20 and/or the client networks 12 to discover the configuration items 402 of the system 400. It should be understood that the term "logic" as used in the present disclosure, and indeed all components of the system 400, may be implemented in software (e.g., machine-readable and/or processor-executable instructions, including firmware), hardware (e.g., circuitry), or both. The configuration items 402 may include physical entities (e.g., computers, routers, or other devices), logical entities (e.g., database instances, server instances, or other instances), and/or conceptual entities (e.g., requisition services, migration services, or other services). Once configuration items are discovered, the configuration item discovery logic 408 may store records corresponding to the configuration items 402 (e.g., configuration item records 410) in a configuration management database (CMDB) 412. The CMDB 412 may be used to manage the configuration items 402 by storing configurations, attributes, descriptions, and/or any other suitable information associated with the configuration items 402.

A configuration item 402 may span one or many configuration item records 410 in one or many tables in the CMDB 412, with each configuration item record 410 having references to the other configuration item records 410 that make up the configuration item 402. For example, at least a portion of a configuration item record 410 may refer to a sub-component of a server, such as a network interface card or various software present on the server. Additional information about the configuration item 402 may also exist outside of CMDB 412, such as in a table stored in other components of the client instance 102, and also reference the configuration item record 410.

The client instance 102 may also implement vulnerability response logic 414, which may receive indications of vulnerabilities 404 from one or more vulnerability databases 416. The vulnerability databases 416 may include any suitable source that publishes cybersecurity vulnerabilities 404, including third-party sources. For example, the vulnerabilities 404 may include those enumerated as Common Vulnerability Exposure (CVE) by The MITRE Corporation (MITRE) and/or cataloged by the National Vulnerability Database (NVD) as listed on nist.gov. Other vulnerability databases 416 may include the Japan Vulnerability Notes (JVN) of the Japan Computer Emergency Response Team Coordination Center (JPCERT/CC), the Chinese National Vulnerability Database (CNNVD), Russia's vulnerability database (BDU), and so on.

The vulnerabilities 404 may be entered in the vulnerability database 420 as vulnerability records 418. In some embodiments, a user may manually enter the vulnerability records 418 into the vulnerability database 420, though this may be a tedious process. Practically, users of the client instance 102 may depend on automated integration with the one or more vulnerability databases 416 to populate vulnerability records 418 in the vulnerability database 420.

The vulnerability response logic 414 may determine whether the configuration items 402 are affected by the vulnerabilities 404. In particular, the vulnerability response logic 414 may include a scanner engine 422 that executes one or more comparators 424 that compare a configuration item record 410 to a vulnerability record 418. In some embodiments, the vulnerability response logic 414 may iterate through each configuration item record 410 and each vulnerability record 418, using each comparator 424. Each comparator 424 may receive, as inputs, a configuration item record 410 and a vulnerability record 418 and may determine whether a configuration item record 410 correlates to (e.g., matches) a vulnerability record 418. In additional or alternative embodiments, if a comparator 424 determines a correlation between a configuration item record 410 and a vulnerability record 418, then the scanner engine 422 may skip implementing the remaining comparators 424, as a correlation has been found. Scanning by the scanner engine 422 and/or the comparators 424 may be performed on a periodic or on-demand basis, which may be configured or scheduled by a user. In some cases, the scanner engine 422 and/or the comparators 424 may scan the system 400 and/or affected configuration items 402 as configuration items 402 and/or vulnerabilities 404 are added or modified, as configuration items records 410 and/or vulnerability records 418 are added to or modified in the CMDB 412 and/or the vulnerability database 420, or as supporting referenced records in the CMDB 412, the vulnerability database 420, and/or the system 400 of the configuration items 402 and/or the vulnerabilities 404 are added or modified.

A comparator 424 may determine that a configuration item record 410 correlates to a vulnerability record 418 if, for example, operating system and/or application information (e.g., including version information, release information, patch information) of the configuration item record 410 is similar to or the same as that of the vulnerability record 418. A correlation between the configuration item record 410 and the vulnerability record 418 may be referred to as a detection of the vulnerability 404 corresponding to the vulnerability record 418 with respect to the configuration item 402 corresponding to the configuration item record 410. There may be one or more detections of a single vulnerability 404 on a single configuration item 402 when there are multiple avenues of determining or exploiting the single vulnerability 404 on the single configuration item 402. Detections may be grouped into one or more vulnerable items 426, which may be stored in a vulnerable item database 428. Each vulnerable item 426 may include a reference to the comparator 424 or comparators 424 for which the vulnerability 404 was detected in the configuration item 402.

Each comparator 424 may access the configuration item record 410 and/or the vulnerability record 418 passed as arguments, any referenced records of the configuration item record 410 and/or the vulnerability record 418, and any other records or tables in the client instance 102 to perform the detection. Each comparator 424 may also be configurable and scriptable, meaning that the comparator 424 implementation may be customized and tuned to suit a specific data set present on the client instance 102 using a scripting language, such as JavaScript. Additionally, more or fewer comparators 424 may be added to the scanner engine 422, or a selection of comparators 424 may be disabled.

In some embodiments, the scanner engine 422 and/or comparators 424 may integrate with third-party comparators or scanners, which may supplement the comparators 424 with additional vulnerability detections and/or confirm detections of vulnerabilities 404. In particular, a third-party scanner may operate similarly to the scanner engine 422 and/or a comparator 424, but may exist and/or execute external to the client instance 102. As an example, the third-party scanners may scan ports of the system 400 or perform penetration testing on the system 400 to confirm that a vulnerability 404 is exploitable on the system 400. However, in some cases, a third-party scanner may not detect a vulnerability 404 because one or more mitigating controls may be practiced that prevent exploitation of that vulnerability 404.

For example, a mitigating control may include closing a networking port on which a software application of the system 400 is vulnerable at the operating system level so that the application may not be exploited. As another example, a mitigating control may include filtering requests or inspecting incoming packets (e.g., by one or more network devices prior to the requests reaching a server) for exploitative requests. If a mitigating control is lifted, for example by reconfiguration of the network (e.g., 12, 14) or re-allowing access to a port in an operating system of the system 400, then a vulnerability 404 that was previously being mitigated may then be detected and confirmed by a third-party scanner or exploited by a malicious actor. As such, it is desirable to detect, track and remediate the vulnerable items 426 of the system 400, regardless of whether a third-party scanner is used, to avoid the potential of exploitation of the vulnerable item 426 when a mitigating control is removed or reconfigured for a vulnerability 404 that may have gone undetected by a third-party scanner.

In some cases, the scanner engine 422 and/or the comparators 424 may not find a correlation between a configuration item record 410 and a vulnerability record 418 where it previously had before (generating a vulnerable item 426). As such, the vulnerable item 426 may be closed. For example, a vulnerable item 426 may have been previously detected on a configuration item 402 by a comparator 424 or a third-party scanner, but the configuration item 402 has since been patched with a software update, and now produces a negative match through the scanner engine 422.

Vulnerable items 426 are stored in the vulnerable item database 428 so that the vulnerabilities 404 that correspond to the configuration items 402 may be tracked and follow a workflow of remediation, which may include automatic processes of grouping, assignment, risk and remediation assessment, prioritization, and solution assignment leading to the remediation of the vulnerability 404 by the remediation owner. That is, each vulnerable item 426 may be remediated by implementing solutions or remediations 406, such as disabling a software service or upgrading an application to a newer version. The solutions 406 may be stored in one or more solutions databases 430 of various solutions third-party vendors. The vendors may be the developers and/or providers of software, such as operating systems or applications that are executed by the client network 12 and/or client devices 20. The solutions 406 may be in the form of patches, workarounds, mitigation steps, or any other suitable guidance that remediate (e.g., fix, solve, patch, or otherwise address) the vulnerabilities 404. As an example, one solutions database 430 may be maintained by the Microsoft® Security Response Center, which may provide solutions 406 to vulnerabilities identified as CVEs by MITRE and/or cataloged by the NVD. At least some solutions 406 may be imported into the client instance 102 through integrations to software vendor security application programming interfaces (APIs), such as the Microsoft® Security Response Center API, the Redhat Security Data APIs, or so on. In some embodiments, these integrations may populate solutions in the client instance 102 with references to vulnerabilities 404 that the solutions 406 solve. The vulnerability response logic 414 may determine further relationships between the solutions 406, including whether the solutions 406 supersede other solutions, whether the solutions 406 are superseded by other solutions, and/or whether vulnerabilities 404 are inherited through these supersedence chains.

Newly discovered vulnerabilities 404 in the vulnerability databases 416 are published on an ongoing basis, and the number of vulnerabilities 404 (e.g., CVE's or third-party vulnerabilities) published throughout a month can be very large. For example, in one month, over 2000 vulnerabilities 404 may be published in the vulnerability databases 416, and that number increases as new technologies, products, operating systems, software applications, product versions, and so on, are discovered and/or implemented. Accordingly, the process of detecting vulnerabilities 404 for the system 400 is often automated.

Relying on third-party scanners may result in slow reaction to newly published vulnerabilities 404 related to configuration items 402 for some period of time (e.g., days, weeks, or months). There are many factors that can lead to these delays, such as an organization using the system 400 having a very expansive network of configuration items 402 and being practically unable to complete scanning of every configuration item 402 every day. In such cases, while scans may be executed daily, the scans may only scan a subset of the configuration items 402 on a rotating basis. While this may be a practical solution to eventually scanning every configuration item 402 of the system 400, this may result in one or more configuration items 402 being scheduled and scanned every few days or few weeks as the scan rotates to different subsets of the configuration items 402. Indeed, it is not uncommon for some systems (e.g., 400) to have configuration items 402 that have not been scanned for two weeks or longer while waiting for their respective scan schedule to be performed.

Moreover, as another example of how scan results may be delayed, it may take time (e.g., on the scale of days) for third-party vendors to integrate how to detect newly published vulnerabilities 404 into a third-party scanner or comparator to ensure that the third-party scanner or comparator properly detects the newly published vulnerabilities 404. As noted above, the third-party scanner may operate similarly to the scanner engine 422 and/or a comparator 424, but may exist and/or execute external to the client instance 102. The more complicated the vulnerability 404 is to detect, the longer it may take for the vendor to perform this integration. This software update may then be propagated to a scanner or comparator instance (e.g., comparator 424) executed by the scanner engine 422 before the scanner or comparator instance 424 operates to detect the newly published vulnerability 404 on the configuration items 402. This scanner or comparator 424 capability delay may be compounded by the rotating scan schedule described above, as even if a new vulnerability 404 is published and a scanner or comparator 424 runs on a configuration item 402 after the publish date, the scanner or comparator 424 may not be updated yet, and thus may be unable to detect the newly published vulnerability 404. Thus, accurate results may be delayed until the next scan is performed on the configuration item 402 (e.g., assuming that the scanner or comparator 424 is updated by this time).

Third-party scan results themselves may also be delayed due to integration of the scan results with third-party systems. That is, even upon the scanner engine 422 and/or a third-party comparator 424 completing a scan that detected a newly published vulnerability 404 on a configuration item 402, there may be a delay before that result is available due to integrating the scan result with a respective third-party system. This may be due to data transformations, data migrations, data warehousing, and other data processing that may occur on the scan results (e.g., vulnerable items 426) in the third-party systems before those results are presented. Such a delay may be on the scale of several days, even while integrating daily. Indeed, a new detection of a vulnerability 404 (e.g., a vulnerable item 426) may be retrieved for integration that was not retrieved on previous integrations performed on previous days, even though the new detection has a detection date from a scan that happened several days ago.

Vulnerability detections may additionally or alternatively be delayed due to integration scheduling by the vulnerability response logic 414. In many embodiments, the vulnerability response logic 414 may automatically integrate vulnerability detections (e.g., vulnerable items 426) on a periodic basis (e.g., once daily), but that scheduled integration may be missed when a new scan result (e.g., indicating the vulnerable items 426) is made available. This may be due to other previous delays of making the scan result available to integration. So, retrieval of the scan result may be delayed until the next automatic integration performed by the vulnerability response logic 414. This delay may be on the scale of days, and depend upon the integration schedule for creating a vulnerable item 426 corresponding to detecting a vulnerability 404.

Each of the delays described above, among others, may cumulatively compound a total delay from when a new vulnerability 404 is published to when a user may know that new vulnerability 404 was detected or not detected on a configuration item 402 and address the automatically created corresponding vulnerable item 426 through a remediation process. This delay can be quite lengthy in some cases, and for critical vulnerabilities with high exposure, any delay leaves the configuration item 402 and the system 400 at risk of a security breach.

To mitigate exposure and exploitation of vulnerabilities 404 for which identification and/or remediation may be delayed as described above, the disclosed techniques may predict when a vulnerability 404 exists on a configuration item 402 before a third-party scanner or comparators (e.g., comparators 424) may detect or confirm the vulnerability 404. In some cases, the disclosed techniques may replace the third-party scanners, either in whole or in part. This may be particularly beneficial because third-party scanners are often expensive, both to purchase and implement.

The disclosed early prediction techniques determine whether a vulnerable item 426 is likely to exist (e.g., a vulnerability 404 exists on a configuration item 402) without using a third-party scanner to scan for the vulnerability 404 on the configuration item 402, and, if so, generate a predicted vulnerable item 432 (e.g., in a predicted vulnerable item database 434) and process the predicted vulnerable item 432 similar to a vulnerable item 426. In particular, a vulnerable item 426 may cycle through states related to detection and remediation, such as an open state, a quarantined state, and a closed state, among others. The predicted vulnerable item 432 may also cycle through such states, but may also additionally cycle through a predicted state—where the predicted vulnerable item 432 has not been configured as a vulnerable item 426 (e.g., by a third-party scanner). Thus, third-party scanning may still be used to confirm whether a predicted vulnerable item 432 is a vulnerable item 426, and a predicted vulnerable item 432 may be promoted to a vulnerable item 426 when confirmed by the third-party scanner to exist, or closed or deleted when confirmed by the third-party scanner to not exist.

In some embodiments, the vulnerable item database 428 and the predicted vulnerable item database 434 may be implemented as a single database. In such embodiments, the predicted vulnerable item 432 may be implemented as a vulnerable item 426 having a "predicted" status. When the predicted vulnerable item 432 is confirmed as a vulnerable item 426, the "predicted" status may be cleared. If the predicted vulnerable item 432 is confirmed as not being subject to the associated vulnerability 404, then the predicted vulnerable item 432 may be removed from the predicted vulnerable item database 434 (and the vulnerable item database 428).

The vulnerability response logic 414 may generate a predicted vulnerable item 432 using a number of techniques, though each technique may include determining whether a vulnerability 404 or vulnerability record 418 is newer than a configuration item's last scan date. Vulnerability records 418 may be stored and updated regularly in the vulnerability database 420 through integration with one or more vulnerability databases 416 (e.g., NVD), where one of the vulnerability fields stored is a published date of the vulnerability 404. A configuration item's last scan date may be a metric maintained by the vulnerability response logic 414, and include a timestamp of when the configuration item 402 was last assessed for vulnerabilities 404 by one or more third-party scanners. The configuration item's last scan date may be discovered by the configuration item discovery logic 408 when iterating through the client devices 20 and/or the client networks 12 to discover the configuration items 402 of the system 400.

In some cases, every configuration item 402 may not have a corresponding configuration item record 410 in the CMDB 412, such as when a configuration item 402 has not yet been discovered yet by the configuration item discovery logic 408. This may be due to the configuration item 402 being recently added on the client device 20 and/or the client network 12, or may be due to scanner configuration such that the configuration item 402 is not included in any vulnerability scanning. For such configuration items 402, the last scan date may be considered as a date value less than a vulnerability publish date, may be populated by the scanner engine 422 within the CMDB 412, or may alternatively be excluded from vulnerability prediction.

Configuration items 402 may also have multiple configuration item records 410. As one among many examples, this may occur when a third-party scanner erroneously assigns multiple discovery identifiers (e.g., corresponding to configuration item records 410) to a single configuration item 402 when the configuration item 402 is not being consistently identified by the third-party scanner. Multiple configuration item records 410 for a configuration item 402 may also result when a single configuration item 402 is being scanned by multiple third-party scanners, multiple configurations of a single third-party scanner, or included in multiple rotations of scans of a single configuration of a single scanner. In this event the most recent scan date from all related configuration item records 410 may be used for comparison. In some circumstances, if no configuration item records 410 exist for a configuration item 402, the vulnerability response logic 414 may assume that the last scan date for the configuration item 402 is prior to the vulnerability 404 publish date (effectively confirming that the configuration item 402 has not been scanned for the vulnerability 404). In other cases, the vulnerability response logic 414 may disregard a configuration item 402 without a corresponding configuration item record 410 from scanning by the scanner engine 422 altogether. It is contemplated that, in some embodiments, the vulnerability response logic 414 may pad the last scan date with a configurable number of days to bridge some of the delay conditions discussed above.

In some embodiments, the vulnerability response logic 414 may query and sort, in descending order, vulnerability records 418 in the vulnerability database 420 by publish date. The vulnerability response logic 414 may then iterate through each vulnerability record 418 in descending order. For each iterated vulnerability record 418, the vulnerability response logic 414 may query configuration items records 410 in the CMDB 412 that have a last scan date that is older than the vulnerability record publish date. If no last scanned dates of the configuration items records 410 are older than the iterated vulnerability record publish date, then the iteration ends. But for the configuration items records 410 found with last scanned dates that are older than publish dates of each vulnerability record 418, one or more (or all) of the disclosed techniques (as described in FIGS. 6, 8, 9, and 11) may be performed to determine whether each configuration item 402 is likely to have the vulnerability 404, thus causing the vulnerability response logic 414 to generate a predicted vulnerable item 432 in the predicted vulnerable item database 434. That is, each configuration item 402 with a last scanned date that pre-dates the publish date of the iterated vulnerability 404 is iterated one at a time for each vulnerability 404 to be considered by the disclosed techniques.

In a first embodiment, a comparator (e.g., 424) may be implemented that compares operating system and/or application information (e.g., including version information, release information, patch information) of the vulnerability 404 (e.g., as stored in the corresponding vulnerability record 418) to operating system and/or application information of the configuration items 402 (e.g., as stored in corresponding configuration item records 410). In particular, the vulnerability 404, as provided by the one or more vulnerability databases 416, may include a Common Platform Enumeration (CPE). The CPE is a structured string value that contains information about the operating system and/or application information affected by the vulnerability 404. The vulnerability response logic 414 may extract the CPE information from the CPE encoded string of the vulnerability 404 following the documented structured format of the CPE string format standard to its constituent parts, and store the CPE information as part of the corresponding vulnerability record 418 in the vulnerability database 420. A CPE may store only operating system information if the vulnerability 404 applies only to an operating system, and store only application information if the vulnerability 404 applies only to an application. The CPE may store both operating system and application information if the vulnerability 404 pertains to a particular combination of an operating system and an application. Version numbers or ranges of version numbers of the operating system and/or applications may also be present in the CPE string if the vulnerability 404 is applicable to a particular version or version ranges of operating systems and/or applications.

The configuration item 402 may have corresponding attributes indicating operating system, applications, and/or versions running on or otherwise associated with the configuration item 402. The configuration item 402 may also reference other records detailing additional information about the configuration item 402, the operating system running on the configuration item 402, and/or one or more applications running on the configuration item 402. These attributes and referenced records may be part of the configuration item record 410 stored in the CMDB 412 or maintained by other applications, including the vulnerability response logic 414 or management software of the client instances 102.

Figure 6:
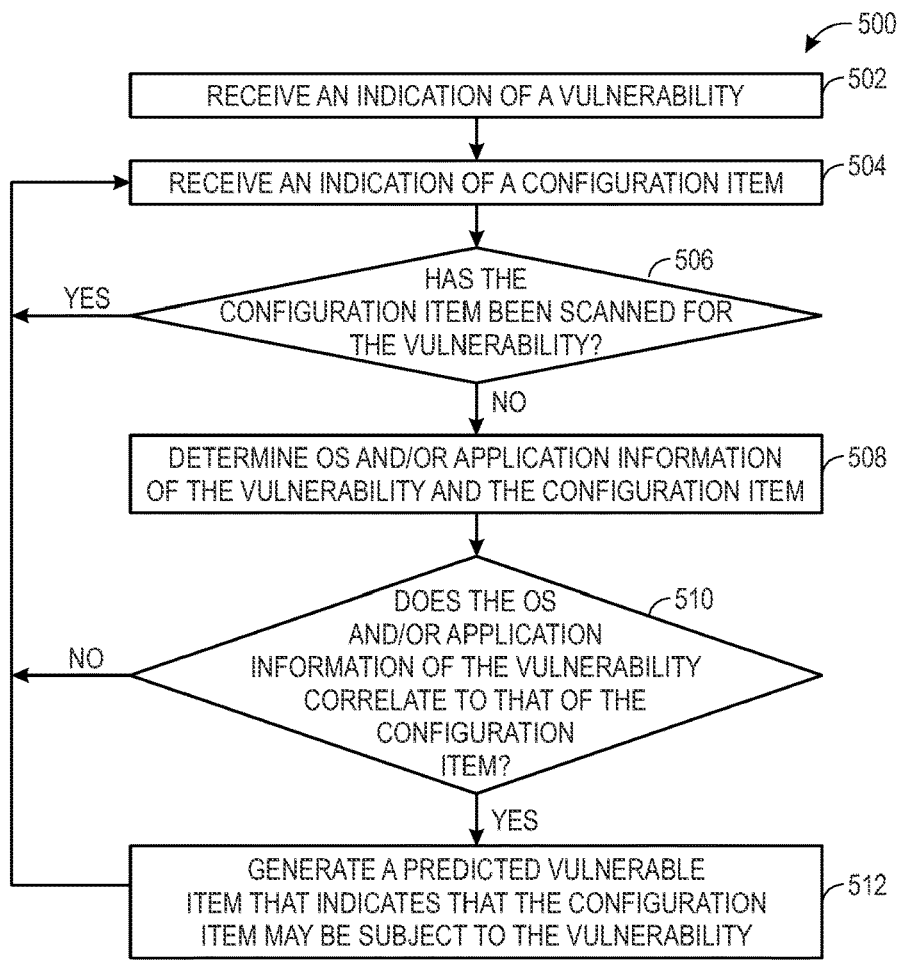
FIG. 6 is a flow diagram illustrating a process for predicting whether a configuration item has a known vulnerability based on operating system and/or application information, according to embodiments of the present disclosure.

The vulnerability response logic 414 may then compare this operating system and/or application information gathered from the iterated vulnerability 404 (as provided by the CPE information) to the operating system and/or application information of the configuration item 402 (inclusive of referenced records and data). In particular, FIG. 6 is a flow diagram illustrating a process 500 for predicting whether a configuration item 402 has a known vulnerability 404 based on operating system and/or application information, according to embodiments of the present disclosure. The process 500 may be performed, for example, by the system 400 of FIG. 5, and, more particularly, the vulnerability response logic 414, a comparator 424, and/or the client instance 102. While the process 500 is described using steps in a specific sequence, it should be understood that the present disclosure contemplates that the describe steps may be performed in different sequences than the sequence illustrated, and certain described steps may be skipped or not performed altogether.

It should be understood, as described above, that the process 500 may be performed by iterating through each vulnerability 404, for each configuration item 402. In alternative or additional embodiments, iterations may be performed for subsets of vulnerabilities 404 and/or configuration items 402 according to, for example, scanning schedules. As another example, iterations may be performed for only those vulnerabilities that have published or modified dates that are more recent than a previously performed (e.g., the most recently performed) scan. Additionally or alternatively, iterations may be performed for only those configuration items 402 that have last scan dates more recent than a previously performed (e.g., the most recently performed) scan. For example, iterations may be performed for only those vulnerabilities that have published or modified dates and only those configuration items 402 that have last scan dates more recent than a previously performed (e.g., the most recently performed) scan.

In process block 502, the vulnerability response logic 414 receives an indication of a vulnerability 404. In particular, third-party vulnerability publishers may publish the vulnerability 404 in one or more vulnerability databases 416. The vulnerability response logic 414 may periodically scan the one or more vulnerability databases 416 to determine whether there are updates to previous vulnerabilities 404 it has stored as vulnerability records 418 in the vulnerability database 420. If so, the vulnerability response logic 414 may add new or update current vulnerability records 418 in the vulnerability database 420 reflecting those updates.

In process block 504, the vulnerability response logic 414 receives an indication of a configuration item 402. In particular, the configuration item discovery logic 408 may discover the configuration item 402 on a client device 20 and/or a client network 12. The configuration item discovery logic 408 may then store the configuration item 402 (or attributes and/or details of the configuration item 402) as a configuration item record 410 in the CMDB 412.

In decision block 506, the vulnerability response logic 414 determines whether the configuration item 402 has been scanned for the vulnerability 404. If so, then the vulnerability response logic 414 repeats process block 504 for another configuration item 402. In particular, the vulnerability response logic 414 may determine that the configuration item 402 has been scanned for the vulnerability 404 if the scan date for the configuration item 402 is more recent than the publish date for the vulnerability 404. The scan dates, including the last scan date, for the configuration item 402 may be stored in any suitable location, such as in the corresponding configuration item record 410 in the CMDB 412, or in a separate table and/or record. Similarly, the publish date for the vulnerability 404 may be stored in any suitable location, such as in the corresponding vulnerability record 418 in the vulnerability database 420, or in a separate table and/or record. If no configuration items 402 remain to be iterated through, then the vulnerability response logic 414 repeats process block 504 for another vulnerability 404. If no vulnerabilities 404 remain to be iterated through, then the process 500 is complete, and the vulnerability response logic 414 may repeat the process 500 at the next scheduled date and time.

If the vulnerability response logic 414 determines that the configuration item 402 has not been scanned for the vulnerability 404, then, in process block 508, the comparator 424 determines operating system and/or application information of the vulnerability 404 and the configuration item 402. In particular, the vulnerability comparator 424 may determine that the configuration item 402 has not been scanned for the vulnerability 404 if the scan date for the configuration item 402 is older than the publish date for the vulnerability 404. The comparator 424 may determine the operating system and/or application information of the vulnerability 404 by accessing the corresponding vulnerability record 418 stored in the vulnerability database 420, and determine the operating system and/or application information of the configuration item 402 by accessing the corresponding configuration item record 410 stored in the CMDB 412.

In decision block 510, the comparator 424 determines whether the operating system and/or application information of the vulnerability 404 correlates to that of the configuration item 402. In particular, the comparator 424 determines whether the operating system and/or application information, including version information, release information, patch information, and so on, of the vulnerability 404 matches that of the configuration item 402. In some embodiments, the operating system and/or application information of the vulnerability 404 and the configuration item 402 may be in the form of strings (including CPE strings). Accordingly, a comparator 424 of the scanner engine 422 may compare a first string describing the operating system and/or application information of the vulnerability 404 and a second string describing the operating system and/or application information of the configuration item 402, and output whether the strings are a match, thus confirming that the operating system and/or application information of the vulnerability 404 correlates to that of the configuration item 402. In some embodiments, the comparator 424 may reformat third-party formatted operating system and/or application information (including version information, release information, patch information, and so on) from the configuration item record 410 corresponding to the configuration item 402 to generate the second string describing the operating system and/or application information of the configuration item 402. In additional or alternative embodiments, the comparator 424 may reformat tables related to the vulnerability 404 and/or the configuration item 402 into the first input string or the second input string for input into the comparator 424. The comparison performed by the comparator 424 may also include use of wildcards, where an operating system, application, or version field of the respective input string or strings may include a wildcard value. In such cases, the comparator 424 may determine that a positive match is found by the comparison for any present or absent value when the wildcard value exists on either side of the comparison.

In some embodiments, if neither the operating system nor application information is present for the vulnerability 404 or the configuration item 402, the comparator 424 determines that there is no correlation. In additional or alternative embodiments, if the vulnerability record 418 includes operating system and/or application information, and the configuration item record 410 does not have respective operating system and/or application information, the comparator 424 determines that there is no correlation. As an example, if the vulnerability record 418 includes operating system information that does not match the operating system information stored in the configuration item record 410, the comparator 424 determines that there is no correlation. As another example, if the vulnerability record 418 includes application information, and the multiple applications running on the configuration item 402 do not correspond to that application information (e.g., no such application or application version runs on the configuration item 402), the comparator 424 determines that there is no correlation. In some embodiments, when both the vulnerability record 418 and the configuration item record 410 store operating system versions or version ranges, and the versions are not equal or the version ranges do not intersect or overlap, the comparator 424 determines that there is no correlation. Similarly, when both the vulnerability record 418 and the configuration item record 410 store application versions or version ranges, and the versions are not equal or the version ranges do not intersect or overlap, the comparator 424 determines that there is no correlation. In some embodiments, only after passing the above-described non-correlating cases does the vulnerability response logic 414 proceeds to process block 512.

If the comparator 424 determines that the operating system and/or application information of the vulnerability 404 does not correlate to that of the configuration item 402, then the vulnerability response logic 414 repeats process block 504 for another configuration item 402. If no configuration items 402 remain to be iterated through, then the vulnerability response logic 414 repeats process block 502 for another vulnerability 404. If no vulnerabilities 404 remain to be iterated through, then the process 500 is complete, and the vulnerability response logic 414 may repeat the process 500 at the next scheduled date and time.

If the comparator 424 determines that the operating system and/or application information of the vulnerability 404 correlates to that of the configuration item 402, then, in process block 512, the vulnerability response logic 414 generates a predicted vulnerable item 432 that references the configuration item 402 and the vulnerability 404 to indicate that the configuration item 402 may be subject to the vulnerability 404. In particular, the vulnerability response logic 414 may generate a record for the predicted vulnerable item 432 in the predicted vulnerable item database 434 corresponding to the configuration item 402. For example, the record for the predicted vulnerable item 432 in the predicted vulnerable item database 434 may reference the corresponding configuration item record 410. In some cases, field values of the record for the predicted vulnerable item 432 may be filled from values of the configuration item record 410. In some embodiments, the vulnerability response logic 414 may change a status of the configuration item record 410 to indicate that it may have the vulnerability 404 (e.g., to a vulnerable status).

The vulnerability response logic 414 may then repeat process block 504 for another configuration item 402. If no configuration items 402 remain to be iterated through, then the vulnerability response logic 414 repeats process block 502 for another vulnerability 404. If no vulnerabilities 404 remain to be iterated through, then the process 500 is complete, and the vulnerability response logic 414 may repeat the process 500 at the next scheduled date and time. In this manner, the process 500 may predict whether a configuration item 402 has a vulnerability 404 based on operating system and/or application information.

Figure 7:
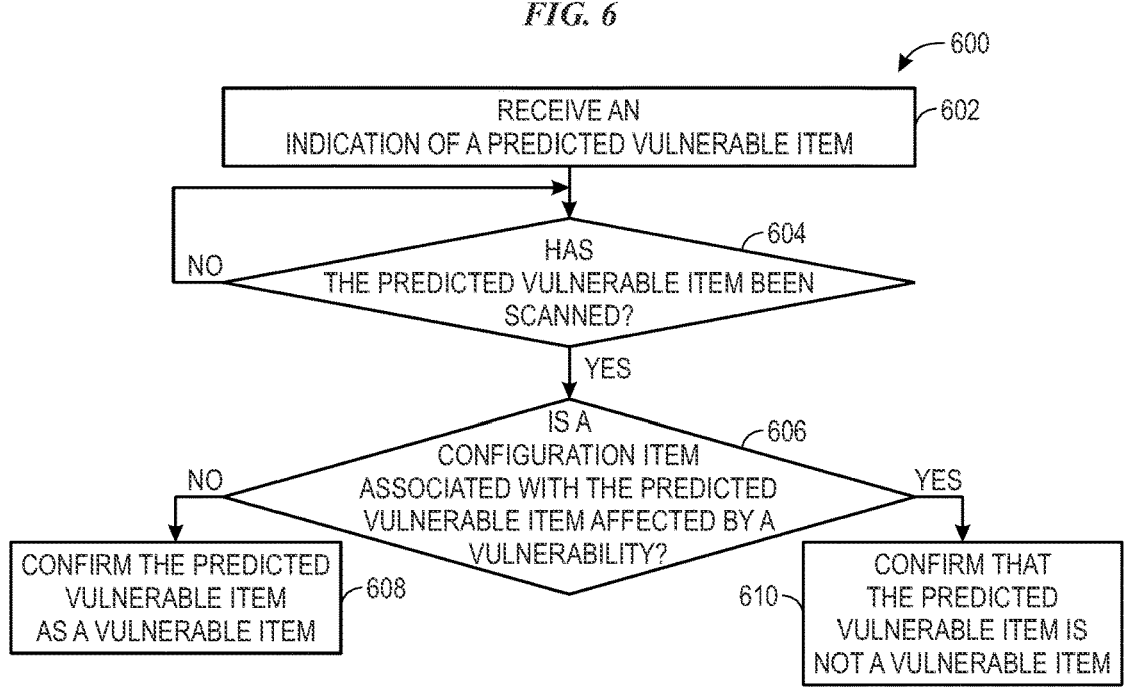
FIG. 7 is a flow diagram illustrating a process for resolving a predicted vulnerable item, according to embodiments of the present disclosure.

FIG. 7 is a flow diagram illustrating a process 600 for resolving a predicted vulnerable item 432, according to embodiments of the present disclosure. In particular, the vulnerability response logic 414 may perform the process 600 after generating or identifying a predicted vulnerable item 432 as described in process block 512 of the process 500. The process 600 may be performed, for example, by the system 400 of FIG. 5, and, more particularly, the vulnerability response logic 414 and/or the client instance 102. While the process 600 is described using steps in a specific sequence, it should be understood that the present disclosure contemplates that the describe steps may be performed in different sequences than the sequence illustrated, and certain described steps may be skipped or not performed altogether.

In process block 602, the vulnerability response logic 414 receives an indication of or determines the predicted vulnerable item 432. In particular, the vulnerability response logic 414 may determine the predicted vulnerable item 432 as described in FIGS. 6, 8, 9, and 11. In decision block 604, the vulnerability response logic 414 determines whether the predicted vulnerable item 432 has been scanned. For example, the vulnerability response logic 414 may determine whether a scan date of the predicted vulnerable item 432 has been updated. The scan may be performed by the scanner engine 422 (e.g., using a scanner or comparator 424 or a third-party scanner) on the predicted vulnerable item 432 to determine whether the corresponding configuration item 402 has been scanned for a vulnerability 404 that is published, but for which the configuration item 402 had not previously been scanned for and was predicted to be affected by the vulnerability 404 (e.g., as described in decision block 506 of FIG. 6).

If the vulnerability response logic 414 determines that the predicted vulnerable item 432 has not been scanned, then the vulnerability response logic 414 repeats decision block 604 until the vulnerability response logic 414 determines that the predicted vulnerable item 432 has been scanned. If the vulnerability response logic 414 determines that the predicted vulnerable item 432 has been scanned, then the vulnerability response logic 414 determines whether the configuration item 402 corresponding to the predicted vulnerable item 432 is affected by a vulnerability 404. For example, the scanner engine 422 (e.g., using a scanner or comparator 424 or a third-party scanner) may scan configuration items 402 to determine whether any configuration items 402 are affected by the vulnerability 404. The vulnerability response logic 414 may determine whether the scan results indicate that the configuration item 402 corresponding to the predicted vulnerable item 432 is affected by the vulnerability 404.

If the vulnerability response logic 414 determines that the configuration item 402 associated with the predicted vulnerable item 432 is affected by the vulnerability 404, then, in process block 608, the vulnerability response logic 414 generates a predicted vulnerable item 432 that references the configuration item 402 and the vulnerability 404 to indicate that the configuration item 402 may be subject to the vulnerability 404. In particular, the vulnerability response logic 414 may generate a vulnerable item 426 in the vulnerable item database 428 corresponding to the predicted vulnerable item 432. In some embodiments, the predicted vulnerable item 432 may be a vulnerable item 426 with a predicted status. As such, the vulnerability response logic 414 may update the predicted status to an open status, thus changing the predicted vulnerable item 432 to a vulnerable item 432. In additional or alternative embodiments, the vulnerability response logic 414 may generate a vulnerable item 426 in the vulnerable item database 428 having the same fields and/or attributes as the predicted vulnerable item 432. The vulnerability response logic 414 may then delete the predicted vulnerable item 432 from the predicted vulnerable item database 434, or change a status of the predicted vulnerable item 432 to a closed or confirmed state.

If the vulnerability 404 is confirmed, actions of the vulnerable item 426 may be limited (e.g., the vulnerable item 426 may be given a reduced level of permissions, access to or of the vulnerable item 426 may be restricted), the vulnerable item 426 may be quarantined, related vulnerable items may be reopened if previously closed (e.g., including past vulnerabilities of the configuration item 402), and so on. In some embodiments, an alert or message may be sent to notify a user of the vulnerable item 426. The vulnerability response logic 414 may subsequently request and receive a solution 406 to the vulnerable item 426 from the one or more solutions databases 430, and execute the solution 406 to remediate the vulnerable item 426. The vulnerable item 426 may then be deleted from the vulnerable item database 428, or the state of the vulnerable item 426 may be changed to a closed state.

If the vulnerability response logic 414 determines that the configuration item 402 associated with the predicted vulnerable item 432 is not affected by the vulnerability 404, then, in process block 610, the vulnerability response logic 414 confirms that the predicted vulnerable item 432 is not a vulnerable item 426. In particular, the vulnerability response logic 414 may delete the predicted vulnerable item 432 from the predicted vulnerable item database 434, or change a status of the predicted vulnerable item 432 to a closed or clear state. In this manner, the process 600 may resolve a predicted vulnerable item 432 by confirming the predicted vulnerable item 432 as a vulnerable item 426 or a configuration item 402 that is not affected by the evaluated vulnerability 404.

Figure 8:
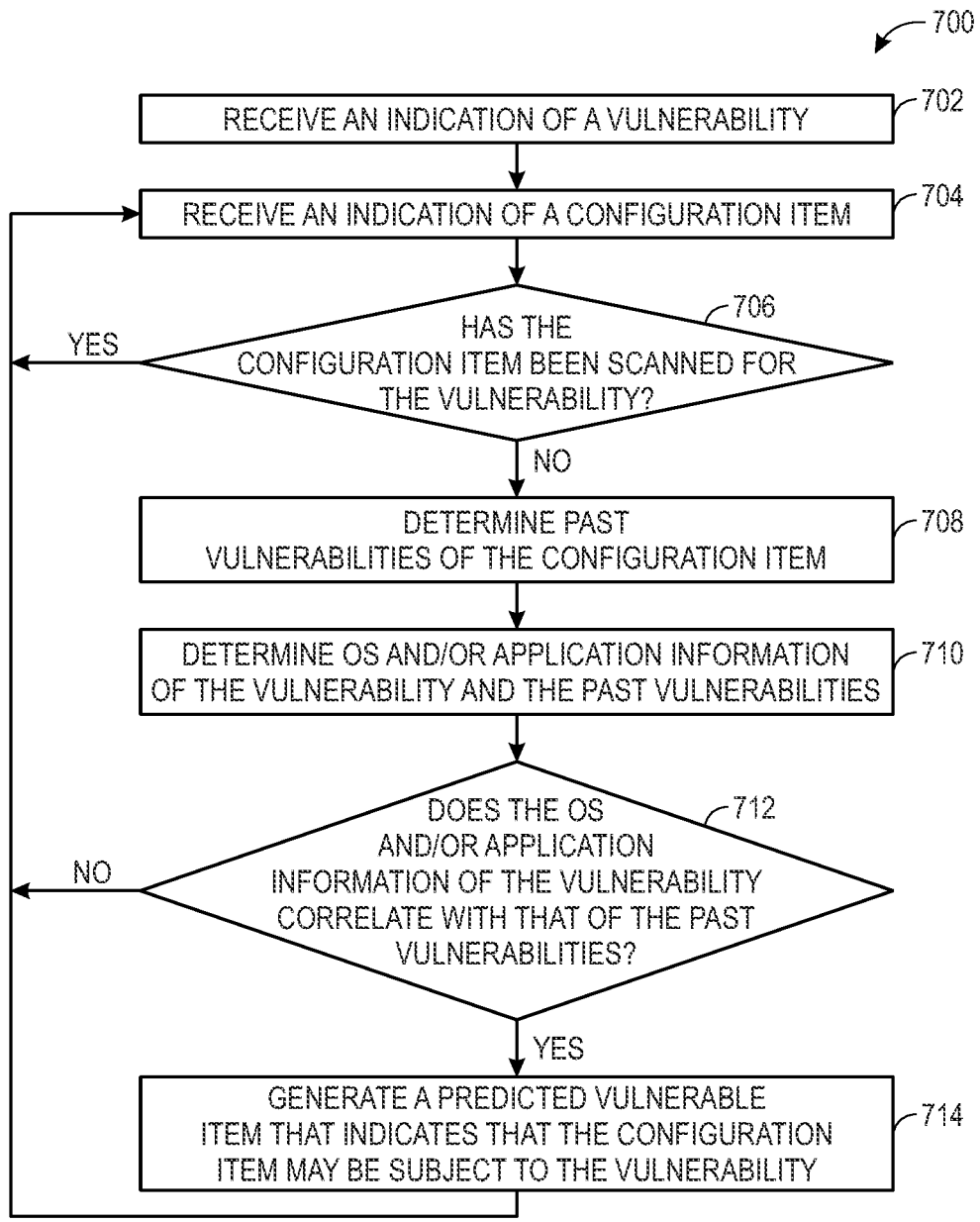
FIG. 8 is a flow diagram illustrating a process for predicting whether a configuration item has a known vulnerability based on past vulnerabilities of the configuration item, according to embodiments of the present disclosure.

In a second embodiment, instead of or in addition to comparing operating system and/or application information of a vulnerability 404 to that of a configuration item 402, a comparator 424 may compare operating system and/or application information of the vulnerability 404 to that of past vulnerabilities of the configuration item 402. FIG. 8 is a flow diagram illustrating a process 700 for predicting whether a configuration item 402 has a known vulnerability 404 based on past vulnerabilities of the configuration item 402, according to embodiments of the present disclosure. The process 700 may be performed, for example, by the system 400 of FIG. 5, and, more particularly, the vulnerability response logic 414, a comparator 424, and/or the client instance 102. While the process 700 is described using steps in a specific sequence, it should be understood that the present disclosure contemplates that the describe steps may be performed in different sequences than the sequence illustrated, and certain described steps may be skipped or not performed altogether.

It should be understood, as described above, that the process 700 may be performed by iterating through each vulnerability 404 and for each configuration item 402. In alternative or additional embodiments, iterations may be performed for subsets of vulnerabilities 404 and/or configuration items 402 according to, for example, scanning schedules. As another example, iterations may be performed for only those vulnerabilities that have published or modified dates that are more recent than a previously performed (e.g., the most recently performed) scan. Additionally or alternatively, iterations may be performed for only those configuration items 402 that have last scan dates more recent than a previously performed (e.g., the most recently performed) scan. For example, iterations may be performed for only those vulnerabilities that have published or modified dates and only those configuration items 402 that have last scan dates more recent than a previously performed (e.g., the most recently performed) scan.

The vulnerability response logic 414 may perform process and decision blocks 702, 704, 706 similar to performing process and decision blocks 502, 504, 506 as described with respect to FIG. 6. In particular, in process block 702, the vulnerability response logic 414 receives an indication of a vulnerability 404, similar to that described in process block 502. In process block 704, the vulnerability response logic 414 receives an indication of a configuration item 402, similar to that described in process block 504. In decision block 706, the vulnerability response logic 414 determines whether the configuration item 402 has been scanned for the vulnerability 404, similar to that described in decision block 506. If so, then the vulnerability response logic 414 repeats process block 704 for another configuration item 402.

If, in decision block 706, the vulnerability response logic 414 determines that the configuration item 402 has not been scanned for the vulnerability 404, then, in process block 708, the comparator 424 determines one or more past vulnerabilities of the configuration item 402. In process block 710, the comparator 424 then determines operating system and/or application information (including version information, release information, patch information, and so on) of the vulnerability 404 and the past vulnerabilities. In decision block 712, the comparator 424 determines whether the operating system and/or application information of the vulnerability correlates with that of the past vulnerabilities.

That is, the comparator 424 determines if the vulnerability 404 is likely to exist on the configuration item 402 by examining past detected vulnerabilities of the configuration item 402. In particular, the vulnerable response logic 414 maintains past vulnerable item records and detection records that were discovered though previous CMDB scanning or third party scanner integrations. For example, the past vulnerabilities may be stored as vulnerable items 426 in the vulnerable item database 428. In some embodiments, the vulnerable items 426 corresponding to past vulnerabilities may be identifiable based on a status of the vulnerable items 426 (e.g., a resolved or clear status).

The past vulnerabilities may include past detections, past vulnerable items, previously predicted vulnerable items, and/or previously predicted detections, which may or may not have been confirmed by a third-party scanner. As such, in some cases, the past vulnerabilities may reference other vulnerabilities. These other vulnerabilities may detail the operating system and/or application information (including version information, release information, patch information, and so on) in a string (e.g., CPE string) format or in another non-standardized third party scanner format. In some embodiments, the comparator 424 may extract the operating system and/or application information from each previously detected vulnerability of the past detection and vulnerable item records of the configuration item 402 and deconstructed from string or other third-party formats so that they may be compared to the string-formatted operating system and/or application information of the iterated vulnerability 404. The third-party vulnerability 404 may also reference other vulnerability records, such as vulnerability records 418 within the vulnerability database 420. The operating system and/or application information of such vulnerability records 418 may be also included in the comparison. The comparator 424 may thus determine whether the operating system and/or application information from the iterated vulnerability 404 correlate to each set of operating system and/or application information from the previously detected vulnerabilities following a similar comparison process as discussed above with respect to decision block 510 of FIG. 6.

If the comparator 424 determines that the operating system and/or application information of the vulnerability 404 does not correlate to that of the vulnerability 404, then the vulnerability response logic 414 repeats process block 704 for another configuration item 402. If no configuration items 402 remain to be iterated through, then the vulnerability response logic 414 repeats process block 702 for another vulnerability 404. If no vulnerabilities 404 remain to be iterated through, then the process 700 is complete, and the vulnerability response logic 414 may repeat the process 700 at the next scheduled date and time.

If the comparator 424 determines that the operating system and/or application information of the past vulnerabilities correlates to that of the vulnerability 404, then, in process block 714, the vulnerability response logic 414 generates a predicted vulnerable item 432 that references the configuration item 402 and the vulnerability 404 to indicate that the configuration item 402 may be subject to the vulnerability 404. In particular, the vulnerability response logic 414 may generate a record for the predicted vulnerable item 432 in the predicted vulnerable item database 434 corresponding to the configuration item 402. For example, the record for the predicted vulnerable item 432 in the predicted vulnerable item database 434 may reference the corresponding configuration item record 410. In some cases, field values of the record for the predicted vulnerable item 432 may be filled from values of the configuration item record 410. In some embodiments, the vulnerability response logic 414 may change a status of the configuration item record 410 to indicate that it may have the vulnerability 404 (e.g., to a vulnerable status).

In some embodiments, the past vulnerabilities may be reopened (e.g., statuses of past vulnerable items corresponding to the past vulnerabilities may have statuses changed to open statuses). The vulnerability response logic 414 may then repeat process block 704 for another configuration item 402. If no configuration items 402 remain to be iterated through, then the vulnerability response logic 414 repeats process block 702 for another vulnerability 404. If no vulnerabilities 404 remain to be iterated through, then the process 700 is complete, and the vulnerability response logic 414 may repeat the process 700 at the next scheduled date and time. In this manner, the process 700 may predict whether a configuration item 402 has a vulnerability 404 based on past vulnerabilities of the configuration item 402. The vulnerability response logic 414 may then perform the process 600 of FIG. 7 to resolve the predicted vulnerable item 432.

Figure 9:
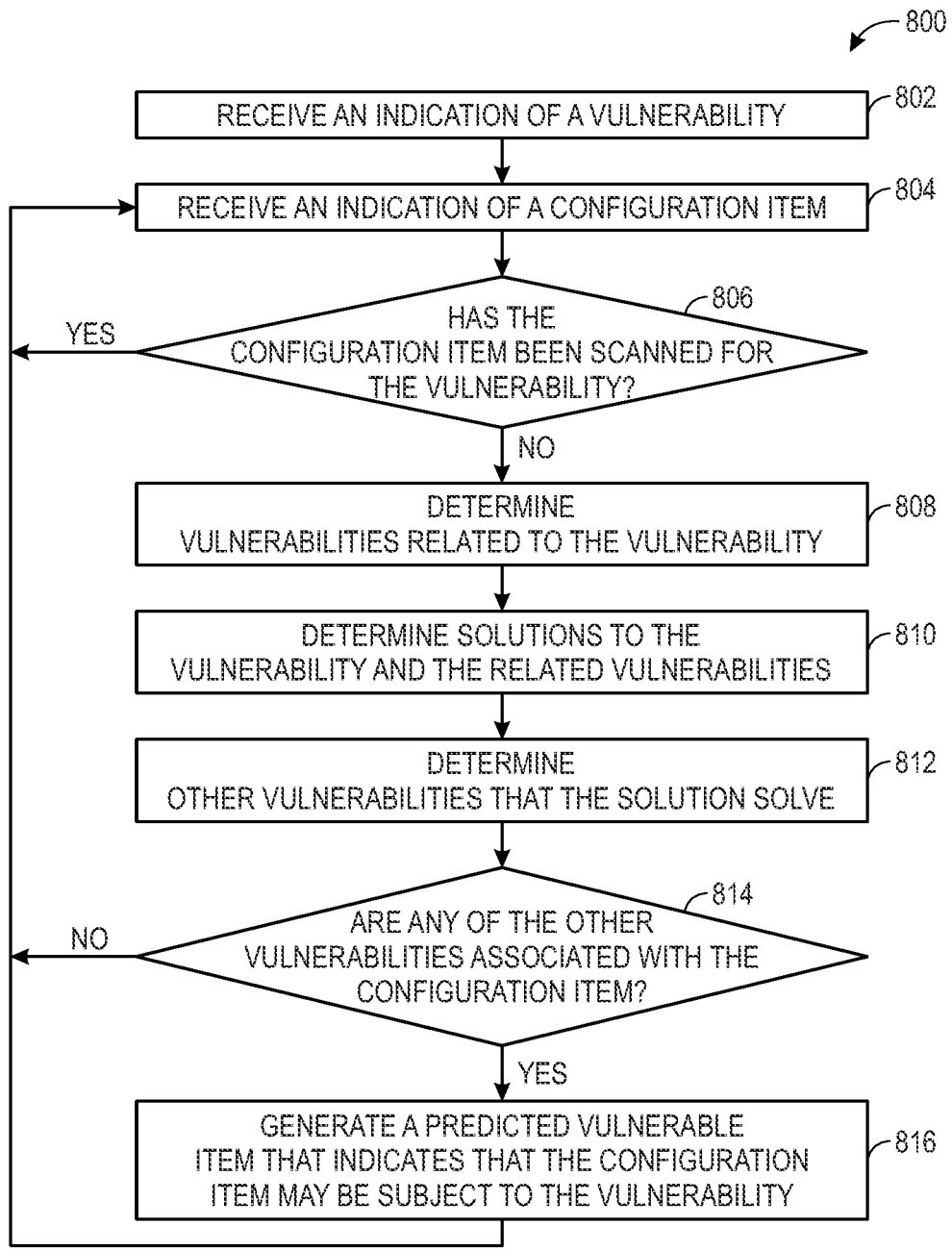
FIG. 9 is a flow diagram illustrating a process for predicting whether a configuration item has a known vulnerability based on related vulnerabilities and solutions to the known vulnerability and/or the related vulnerabilities, according to embodiments of the present disclosure.

In a third embodiment, instead of or in addition to comparing operating system and/or application information of a vulnerability 404 to that of a configuration item 402 or past vulnerabilities, a comparator 424 may determine whether the vulnerability 404 links to the configuration item 402 based on related vulnerabilities and solutions 406 to the vulnerability 404 and/or the related vulnerabilities. FIG. 9 is a flow diagram illustrating a process 800 for predicting whether a configuration item 402 has a known vulnerability 404 based on related vulnerabilities and solutions 406 to the known vulnerability 404 and/or the related vulnerabilities, according to embodiments of the present disclosure. The process 800 may be performed, for example, by the system 400 of FIG. 5, and, more particularly, the vulnerability response logic 414, a comparator 424, and/or the client instance 102. While the process 800 is described using steps in a specific sequence, it should be understood that the present disclosure contemplates that the describe steps may be performed in different sequences than the sequence illustrated, and certain described steps may be skipped or not performed altogether.

It should be understood, as described above, that the process 800 may be performed by iterating through each vulnerability 404 and for each configuration item 402. In alternative or additional embodiments, iterations may be performed for subsets of vulnerabilities 404 and/or configuration items 402 according to, for example, scanning schedules. As another example, iterations may be performed for only those vulnerabilities that have published or modified dates that are more recent than a previously performed (e.g., the most recently performed) scan. Additionally or alternatively, iterations may be performed for only those configuration items 402 that have last scan dates more recent than a previously performed (e.g., the most recently performed) scan. For example, iterations may be performed for only those vulnerabilities that have published or modified dates and only those configuration items 402 that have last scan dates more recent than a previously performed (e.g., the most recently performed) scan.

The vulnerability response logic 414 may perform process and decision blocks 802, 804, 806 similar to performing process and decision blocks 502, 504, 506 as described with respect to FIG. 6. In particular, in process block 802, the vulnerability response logic 414 receives an indication of a vulnerability 404, similar to that described in process block 502. In process block 804, the vulnerability response logic 414 receives an indication of a configuration item 402, similar to that described in process block 504. In decision block 806, the vulnerability response logic 414 determines whether the configuration item 402 has been scanned for the vulnerability 404, similar to that described in decision block 506. If so, then the vulnerability response logic 414 repeats process block 804 for another configuration item 402.

Figure 10:
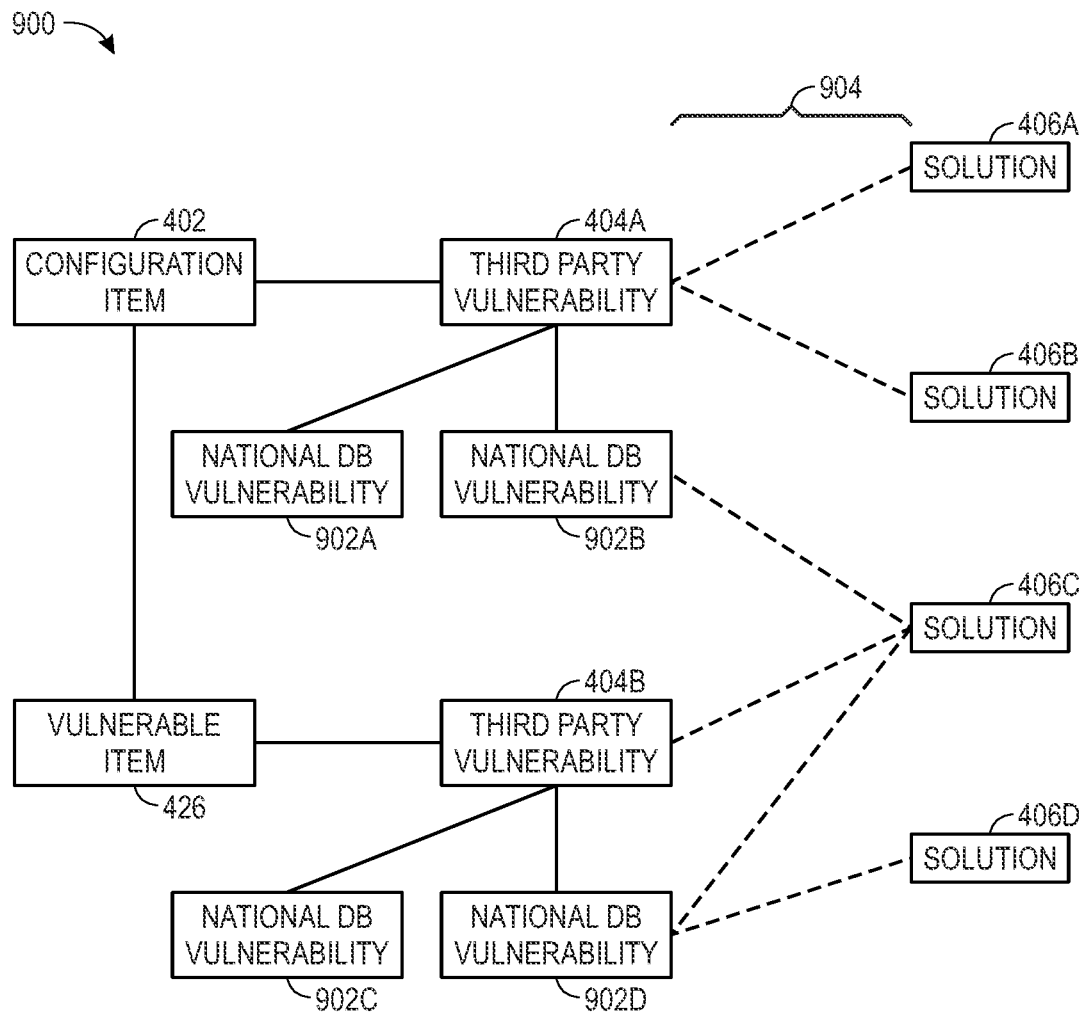
FIG. 10 is block diagram illustrating an example relationship between a vulnerability to a configuration item based on related vulnerabilities and solutions to the vulnerability and/or the related vulnerabilities, according to embodiments of the present disclosure.

If, in decision block 806, the vulnerability response logic 414 determines that the configuration item 402 has not been scanned for the vulnerability 404, then, in process block 808, the comparator 424 determines one or more vulnerabilities related to the vulnerability 404. In particular, the comparator 424 may be a solution comparator that determines vulnerability relationships between the vulnerability 404 and related vulnerabilities. As an illustrative example, FIG. 10 is block diagram illustrating an example relationship 900 between a vulnerability 404 and a configuration item 402 based on related vulnerabilities and solutions 406 to the known vulnerability 404 and/or the related vulnerabilities, according to embodiments of the present disclosure. As illustrated, the comparator 424 may receive, as inputs the configuration item 402 and the vulnerability 404A. In some embodiments, the vulnerability 404A may be a third-party vulnerability, such as a vulnerability that is numbered, cataloged, and/or published by a third-party scanner (e.g., Qualys™, Rapid7™) that may not adhere to common standards of vulnerability reporting. The comparator 424 may then determine vulnerabilities related to the vulnerability 404A, such as national database vulnerabilities 902A, 902B (e.g., published by a national entity, such as NVD, JVN, CNNVD, BDU, and so on). In some embodiments, the comparator 424 may determine related vulnerabilities that are also third-party vulnerabilities, or vulnerabilities that are not sourced by third parties (e.g., internally-defined or discovered vulnerabilities).

Returning to FIG. 9, in process block 810, the comparator 424 determines one or more solutions 406 to the vulnerability 404 and the related vulnerabilities (e.g., 902). That is, the comparator 424 may determine solutions 406 that remedy the vulnerability 404 and/or the related vulnerabilities 902. In some cases, each of these vulnerabilities 404, 902 may have related solutions 406 through many-to-many relationship links between solutions 406 and vulnerabilities 404, 902. As an illustrative example, FIG. 10 illustrates that the comparator 424 may determine that solutions 406A, 406B each remedy the vulnerability 404A, and solution 406C remedies related vulnerability 902B. The dashed lines between the vulnerabilities 404A, 902A, 902B and the solutions 406A, 406B, 406C indicate the many-to-many links 904 that may exist between the vulnerabilities 404A, 902A, 902B and the solutions 406A, 406B, 406C.

Returning to FIG. 9, in process block 812, the comparator 424 determines one or more other vulnerabilities that the solutions 406 (e.g., as determined in process block 810) solve. In particular, the comparator may follow the many-to-many relationship links 904 in the opposite direction to other vulnerabilities (e.g., that are not the original vulnerability 404. Referring again to FIG. 10, the comparator may follow the many-to-many relationship links 904 to determine that solution 406C also solves vulnerability 404B (illustrated as a third-party vulnerability) and vulnerability 902D (illustrated as a national database vulnerability).

Returning to FIG. 9, in decision block 814, the comparator 424 determines whether any of the other vulnerabilities (e.g., as determined in process block 812) are associated with the configuration item 402. In particular, the comparator 424 may determine whether any of the other vulnerabilities affects the configuration item 402, such that there is one or more vulnerable items 426 indicating that the configuration item 402 has one or more of the other vulnerabilities. Thus, the comparator 424 may query the vulnerable item database 428 for vulnerable items 426 corresponding to the other vulnerabilities, and determine whether any of the query results are related to the configuration item 402. As an illustrative example, FIG. 10 illustrates that the comparator 424 may determine that the vulnerability 404B is associated with a vulnerable item 426, which corresponds to the configuration item 402. That is, the vulnerable item 426 indicates that the configuration item 402 is affected by the vulnerability 404B.

If the comparator 424 determines that any of the other vulnerabilities (e.g., as determined in process block 812) are not associated with the configuration item 402, then the vulnerability response logic 414 repeats process block 804 for another configuration item 402. If no configuration items 402 remain to be iterated through, then the vulnerability response logic 414 repeats process block 802 for another vulnerability 404. If no vulnerabilities 404 remain to be iterated through, then the process 800 is complete, and the vulnerability response logic 414 may repeat the process 800 at the next scheduled date and time.

If the comparator 424 determines that any of the other vulnerabilities are associated with the configuration item 402, then, in process block 816, the vulnerability response logic 414 generates a predicted vulnerable item 432 that references the configuration item 402 and the vulnerability 404 to indicate that the configuration item 402 may be subject to the vulnerability 404. In particular, the vulnerability response logic 414 may generate a record for the predicted vulnerable item 432 in the predicted vulnerable item database 434 corresponding to the configuration item 402. For example, the record for the predicted vulnerable item 432 in the predicted vulnerable item database 434 may reference the corresponding configuration item record 410. In some cases, field values of the record for the predicted vulnerable item 432 may be filled from values of the configuration item record 410. In some embodiments, the vulnerability response logic 414 may change a status of the configuration item record 410 to indicate that it may have the vulnerability 404 (e.g., to a vulnerable status).

The vulnerability response logic 414 may then repeat process block 804 for another configuration item 402. If no configuration items 402 remain to be iterated through, then the vulnerability response logic 414 repeats process block 802 for another vulnerability 404. If no vulnerabilities 404 remain to be iterated through, then the process 800 is complete, and the vulnerability response logic 414 may repeat the process 800 at the next scheduled date and time. In this manner, the process 800 may predict whether a configuration item 402 has a vulnerability 404 based on related vulnerabilities 902 and solutions 406 to the vulnerability 404 and/or the related vulnerabilities 902. The vulnerability response logic 414 may then perform the process 600 of FIG. 7 to resolve the predicted vulnerable item 432.

In a fourth embodiment, a machine-learning model may be trained to determine how similar past vulnerabilities of a configuration item 402 are to an input vulnerability 404, and if sufficiently similar, then the machine-learning model may generate a predicted vulnerable item 426 to indicate that the configuration item 402 may be subject to the vulnerability 404. Referring back to FIG. 5, the client instance 102 may include this machine-learning model 436 as part of the scanner engine 422 and/or comparator 424. Thus, the machine-learning model 436 may be communicatively coupled to the vulnerability response logic 414. In some embodiments, a comparator 424 of the scanner engine 422 may operate the machine-learning model 436 to determine how similar past vulnerabilities of a configuration item 402 are to an input vulnerability 404. The machine-learning model 436 may be trained by receiving training data in the form of input configuration items and vulnerabilities, vulnerabilities that are similar to the input vulnerabilities, and confidence scores of the similar vulnerabilities. In particular, the machine-learning model 436 may be trained using the descriptions and summaries of the current and/or past vulnerabilities 404, vulnerable items 426, and/or detections found for each configuration item 402. The machine-learning model 436 may use natural language understanding of description and summary text of configuration items 402 and vulnerabilities 404 to predict whether a predicted vulnerable item 426 should be generated that indicates a configuration item 402 is subject to a vulnerability 404. Additional fields of the configuration items 402 and past vulnerabilities of the configuration item 402 may also be incorporated into the machine-learning model 436 to increase accuracy of the machine-learning model's predictions.

In some embodiments, the training data is provided as arrays, vectors, and/or matrices. Through iteration of the training data, the machine-learning model 436 may learn to accurately determine when to generate a predicted vulnerable item 432 that indicates that a configuration item 402 may be subject, susceptible, or exposed to a given vulnerability 404. The machine-learning model 436 may employ classification, regression, similarity, and/or clustering techniques. Classification algorithms are used when outputs are restricted to a set of values, and regression algorithms are used when the outputs may have any numerical value within a range. Similarity learning is related to regression and classification, but a similarity function is utilized that measures how similar or related two inputs are. Cluster analysis is the assignment of a set of observations (e.g., training datasets) into subsets (called clusters) so that observations within the same cluster are similar according to one or more predesignated criteria, while observations drawn from different clusters are dissimilar. Different clustering techniques make different assumptions on the structure of the training data, often defined by some similarity metric and evaluated, for example, by internal compactness, or the similarity between users of the same cluster, and separation, the difference between clusters.

With this in mind, the machine-learning model 436 may output similar vulnerabilities to the vulnerability 404 and confidence scores that indicate the similarities of the similar vulnerabilities. A comparator 424 may use the output of the machine-learning model 436, compare the confidence scores to a threshold, and determine whether a predicted vulnerable item 426 should be generated for a configuration item 402 based on the comparison.

Figure 11:
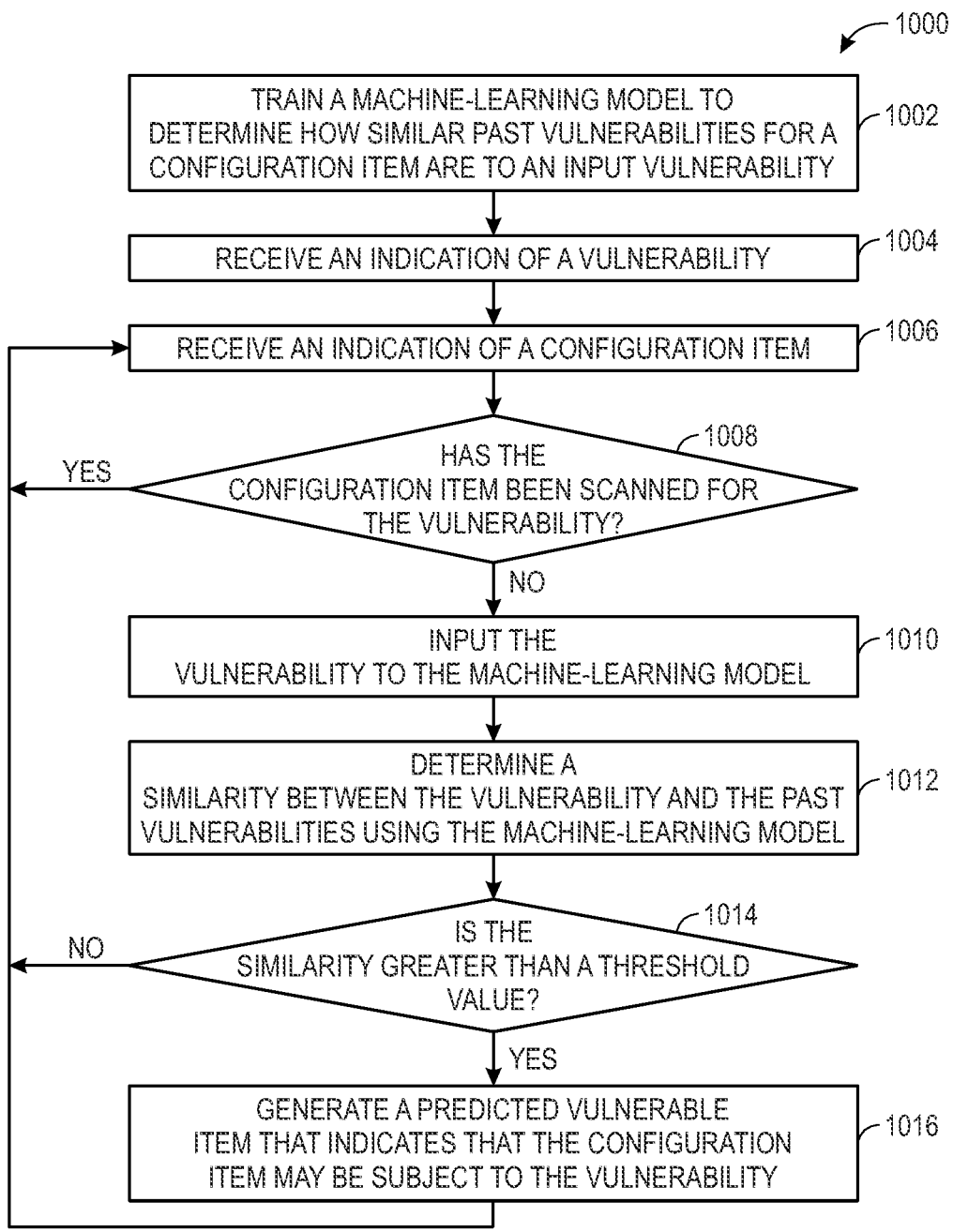
FIG. 11 is a flow diagram illustrating a process for predicting whether a configuration item has a known vulnerability using a machine-learning model, according to embodiments of the present disclosure.

In particular, FIG. 11 is a flow diagram illustrating a process 1000 for predicting whether a configuration item 402 has a known vulnerability 404 using the machine-learning model 436, according to embodiments of the present disclosure. The process 1000 may be performed, for example, by the system 400 of FIG. 5, and, more particularly, the vulnerability response logic 414, the machine-learning model 436, a comparator 424, and/or the client instance 102. While the process 1000 is described using steps in a specific sequence, it should be understood that the present disclosure contemplates that the describe steps may be performed in different sequences than the sequence illustrated, and certain described steps may be skipped or not performed altogether.

It should be understood, as described above, that the process 1000 may be performed by iterating through each vulnerability 404 and for each configuration item 402. In alternative or additional embodiments, iterations may be performed for subsets of vulnerabilities 404 and/or configuration items 402 according to, for example, scanning schedules. As another example, iterations may be performed for only those vulnerabilities that have published or modified dates that are more recent than a previously performed (e.g., the most recently performed) scan. Additionally or alternatively, iterations may be performed for only those configuration items 402 that have last scan dates more recent than a previously performed (e.g., the most recently performed) scan. For example, iterations may be performed for only those vulnerabilities that have published or modified dates and only those configuration items 402 that have last scan dates more recent than a previously performed (e.g., the most recently performed) scan.

In process block 1002, the vulnerability response logic 414 may train the machine-learning model 436 to determine how similar one or more past vulnerabilities 404 for a configuration item 402 are to an input vulnerability 404, as described above. The vulnerability response logic 414 may then perform process and decision blocks 1004, 1006, 1008 similar to performing process and decision blocks 502, 504, 506 as described with respect to FIG. 6. In particular, in process block 1004, the vulnerability response logic 414 receives an indication of a vulnerability 404, similar to that described in process block 502. In process block 1006, the vulnerability response logic 414 receives an indication of a configuration item 402, similar to that described in process block 504. In decision block 1008, the vulnerability response logic 414 determines whether the configuration item 402 has been scanned for the vulnerability 404, similar to that described in decision block 506. If so, then the vulnerability response logic 414 repeats process block 1004 for another configuration item 402.

If, in decision block 1008, the vulnerability response logic 414 determines that the configuration item 402 has not been scanned for the vulnerability 404, then, in process block 1010, the comparator 424 inputs the vulnerability 404 to the machine-learning model 436. In process block 1012, the machine-learning model 436 determines a similarity between the vulnerability 404 and past vulnerabilities of the configuration item 402. In particular, the comparator 424 may use descriptions and/or summaries of the vulnerability 404 and descriptions and/or summaries of the past vulnerabilities (e.g., which may be included in the training data used to train the machine-learning model 436). The machine-learning model 436 may be trained to compare the text or natural language of the descriptions and/or summaries of the vulnerability 404 to that of the past vulnerabilities, and output the similarity as a value. In some embodiments, the similarity may be expressed numerically (e.g., between 0 and 1, or any other suitable numerical range). In additional or alternative embodiments, the comparator 424 may express the similarity in any other suitable format.

In decision block 1014, the comparator 424 determines whether the similarity is greater than a threshold value. The threshold value may be any suitable value that indicates the similarity between the vulnerability 404 and the past vulnerabilities is sufficiently high to consider the configuration item 402 as having the vulnerability 404 in light of the configuration item 402 having the past vulnerabilities. For example, the threshold value may be over 25%, 30%, 50%, 70%, 75%, 80%, 90%, and so on.

If the comparator 424 determines that the similarity is not greater than the threshold value, then the vulnerability response logic 414 repeats process block 1006 for another configuration item 402. If no configuration items 402 remain to be iterated through, then the vulnerability response logic 414 repeats process block 1004 for another vulnerability 404. If no vulnerabilities 404 remain to be iterated through, then the process 1000 is complete, and the vulnerability response logic 414 may repeat the process 1000 at the next scheduled date and time.

If the comparator 424 determines that the similarity is greater than the threshold value, then, in process block 1016, the vulnerability response logic 414 generates a predicted vulnerable item 432 that references the configuration item 402 and the vulnerability 404 to indicate that the configuration item 402 may be subject to the vulnerability 404. In particular, the vulnerability response logic 414 may generate a record for the predicted vulnerable item 432 in the predicted vulnerable item database 434 corresponding to the configuration item 402. For example, the record for the predicted vulnerable item 432 in the predicted vulnerable item database 434 may reference the corresponding configuration item record 410. In some cases, field values of the record for the predicted vulnerable item 432 may be filled from values of the configuration item record 410. In some embodiments, the vulnerability response logic 414 may change a status of the configuration item record 410 to indicate that it may have the vulnerability 404 (e.g., to a vulnerable status).

The vulnerability response logic 414 may then repeat process block 1006 for another configuration item 402. If no configuration items 402 remain to be iterated through, then the vulnerability response logic 414 repeats process block 1004 for another vulnerability 404. If no vulnerabilities 404 remain to be iterated through, then the process 1000 is complete, and the vulnerability response logic 414 may repeat the process 1000 at the next scheduled date and time. In this manner, the process 1000 may predict whether a configuration item 402 has a vulnerability 404 using the machine-learning model 436. The vulnerability response logic 414 may then perform the process 600 of FIG. 7 to resolve the predicted vulnerable item 432.

It should be understood that any or all of these embodiments may be combined to determine whether a predicted vulnerable item 432 should be generated that indicates that a configuration item 402 may be subject to a vulnerability 404. Moreover, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for predicting a vulnerability of a configuration item comprising:
receiving, via one or more processors, an indication of the vulnerability;
receiving, via the one or more processors, an indication of the configuration item;
determining, via the one or more processors, vulnerability operating system information, vulnerability application information, or both of the vulnerability;
determining, via the one or more processors, configuration item operating system information, configuration item application information, or both of the configuration item; and
in response to determining that the vulnerability operating system information correlates to the configuration item operating system information, that the vulnerability application information correlates to the configuration item application information, or both, generating, via the one or more processors, a predicted vulnerable item associated with the configuration item and the vulnerability.

2. The method of claim 1, comprising determining, via the one or more processors, whether the configuration item has been scanned for the vulnerability, wherein generating the predicted vulnerable item occurs in response to determining that the configuration item has not been scanned for the vulnerability.

3. The method of claim 1, wherein the vulnerability operation system information comprises version information of an operating system associated with the vulnerability, release information of the operating system associated with the vulnerability, patch information of the operating system associated with the vulnerability, or any combination thereof, and wherein the configuration item operation system information comprises version information of an operating system associated with the configuration item, release information of the operating system associated with the configuration item, patch information of the operating system associated with the configuration item, or any combination thereof.

4. The method of claim 1, wherein the vulnerability application information comprises version information of a software application associated with the vulnerability, release information of the software application associated with the vulnerability, patch information of the software application associated with the vulnerability, or any combination thereof, and wherein the configuration item application information comprises version information of a software application associated with the configuration item, release information of the software application associated with the configuration item, patch information of the software application associated with the configuration item, or any combination thereof.

5. The method of claim 1, wherein generating the predicted vulnerable item comprises generating a record for the predicted vulnerable item in a database.

6. The method of claim 1, wherein the indication of the vulnerability is received from one or more third-party or national vulnerability databases.

7. One or more tangible, non-transitory, computer-readable media, comprising machine-readable instructions that, when executed by one or more processors, cause the one or more processors to:
receive an indication of a vulnerability;
receive an indication of a configuration item;
determine one or more past vulnerabilities of the configuration item;
determine vulnerability operating system information, vulnerability application information, or both of the vulnerability;
determine past vulnerability operating system information, past vulnerability application information, or both of the one or more past vulnerabilities; and
in response to determining that the vulnerability operating system information correlates to the past vulnerability operating system information, that the vulnerability application information correlates to the past vulnerability application information, or both, generate a predicted vulnerable item associated with the configuration item and the vulnerability.

8. The one or more tangible, non-transitory, computer-readable-media of claim 7, wherein the machine-readable instructions cause the one or more processors to, in response to determining that the vulnerability operating system information correlates to the past vulnerability operating system information, that the vulnerability application information correlates to the past vulnerability application information, or both, limit actions of the predicted vulnerable item.

9. The one or more tangible, non-transitory, computer-readable-media of claim 7, wherein the machine-readable instructions cause the one or more processors to, in response to determining that the vulnerability operating system information correlates to the past vulnerability operating system information, that the vulnerability application information correlates to the past vulnerability application information, or both, quarantine the predicted vulnerable item.

10. The one or more tangible, non-transitory, computer-readable-media of claim 7, wherein the machine-readable instructions cause the one or more processors to, in response to determining that the vulnerability operating system information correlates to the past vulnerability operating system information, that the vulnerability application information correlates to the past vulnerability application information, or both, reopen related vulnerable items related to the configuration item.

11. The one or more tangible, non-transitory, computer-readable-media of claim 10, wherein the related vulnerable items comprise the vulnerable items corresponding to the one or more past vulnerabilities.

12. The one or more tangible, non-transitory, computer-readable-media of claim 7, wherein the machine-readable instructions cause the one or more processors to, in response to determining that the vulnerability operating system information correlates to the past vulnerability operating system information, that the vulnerability application information correlates to the past vulnerability application information, or both, send a notification regarding the predicted vulnerable item.

13. A system, comprising:
at least one memory configured to store instructions; and
at least one processor configured to execute the stored instruction to perform actions comprising:
receiving an indication of a vulnerability;
receiving an indication of a configuration item;
determining vulnerability operating system information, vulnerability application information, or both of the vulnerability;
determining configuration item operating system information, configuration item application information, or both of the configuration item; and
in response to determining that the vulnerability operating system information correlates to the configuration item operating system information, that the vulnerability application information correlates to the configuration item application information, or both, generating a predicted vulnerable item associated with the configuration item and the vulnerability.

14. The system of claim 13, wherein the at least one processor is configured to execute the stored instructions to perform actions comprising:
determining whether the configuration item has been scanned for the vulnerability, wherein generating the predicted vulnerable item occurs in response to determining that the configuration item has not been scanned for the vulnerability.

15. The system of claim 13, wherein the vulnerability operation system information comprises version information of an operating system associated with the vulnerability, release information of the operating system associated with the vulnerability, patch information of the operating system associated with the vulnerability, or any combination thereof, and wherein the configuration item operation system information comprises version information of an operating system associated with the configuration item, release information of the operating system associated with the configuration item, patch information of the operating system associated with the configuration item, or any combination thereof.

16. The system of claim 13, wherein the vulnerability application information comprises version information of a software application associated with the vulnerability, release information of the software application associated with the vulnerability, patch information of the software application associated with the vulnerability, or any combination thereof, and wherein the configuration item application information comprises version information of a software application associated with the configuration item, release information of the software application associated with the configuration item, patch information of the software application associated with the configuration item, or any combination thereof.

17. The system of claim 13, wherein the indication of the vulnerability is received from one or more third-party or national vulnerability databases.

18. A system, comprising:
at least one memory configured to store instructions; and
at least one processor configured to execute the stored instruction to perform actions comprising:
receiving an indication of a vulnerability;
receiving an indication of a configuration item;
determining one or more past vulnerabilities of the configuration item;
determining vulnerability operating system information, vulnerability application information, or both of the vulnerability;
determining past vulnerability operating system information, past vulnerability application information, or both of the one or more past vulnerabilities; and
in response to determining that the vulnerability operating system information correlates to the past vulnerability operating system information, that the vulnerability application information correlates to the past vulnerability application information, or both, generating a predicted vulnerable item associated with the configuration item and the vulnerability.

19. The system of claim 18, wherein, in response to determining that the vulnerability operating system information correlates to the past vulnerability operating system information, that the vulnerability application information correlates to the past vulnerability application information, or both, the at least one processor is configured to execute the stored instructions to perform actions comprising:
limiting actions of the predicted vulnerable item, quarantining the predicted vulnerable item, reopening related vulnerable items that are related to the configuration item, sending a notification regarding the predicted vulnerable item, or any combination thereof.

* * * * *